(12) United States Patent
Chow

(10) Patent No.: US 6,446,548 B2
(45) Date of Patent: Sep. 10, 2002

(54) ROUND BALER TWINE WRAP CONTROL WITH AUTOMATIC RESTART

(75) Inventor: Mark K. Chow, Paoli, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/791,770

(22) Filed: Feb. 26, 2001

Related U.S. Application Data

(63) Continuation-in-part of application No. 09/362,723, filed on Jul. 29, 1999, now Pat. No. 6,209,450.
(60) Provisional application No. 60/095,038, filed on Aug. 3, 1998.

(51) Int. Cl.$^7$ .......................... A01F 15/07; B65B 63/04
(52) U.S. Cl. .................. 100/4; 53/587; 56/341; 100/5; 100/13
(58) Field of Search .................. 100/4, 5, 13, 88; 53/587; 56/341

(56) References Cited

U.S. PATENT DOCUMENTS

| | | | | |
|---|---|---|---|---|
| 3,019,015 A | * | 1/1962 | Potter et al. ............... | 100/5 |
| 4,402,259 A | * | 9/1983 | Viaud .................... | 100/5 |
| 4,516,389 A | * | 5/1985 | Core ...................... | 100/13 |
| 4,557,189 A | * | 12/1985 | Schaible ................. | 100/4 |
| 4,627,340 A | * | 12/1986 | Glass et al. .............. | 100/5 |
| 4,656,931 A | * | 4/1987 | Van Den Bossche et al. ... | 100/4 |
| 4,674,403 A | * | 6/1987 | Bryant et al. ............ | 100/4 |
| 5,152,123 A | * | 10/1992 | Viaud et al. .............. | 100/4 |
| 5,231,828 A | * | 8/1993 | Swearingen et al. ........ | 100/5 |
| 5,388,504 A | * | 2/1995 | Kluver ................... | 100/13 |
| 5,551,218 A | * | 9/1996 | Henderson et al. ......... | 100/13 |
| 5,581,974 A | * | 12/1996 | Underhill et al. .......... | 53/587 |
| 5,631,826 A | * | 5/1997 | Chow ..................... | 100/4 |
| 6,021,622 A | * | 2/2000 | Underhill ................. | 53/587 |
| 6,050,052 A | * | 4/2000 | Herron et al. ............. | 53/587 |
| 6,209,450 B1 | * | 4/2001 | Naaktgeboren et al. ...... | 100/4 |

OTHER PUBLICATIONS

New Holland 544, Operator's Manual, 1st Edition, Dec. 1996, pp. 2–1 to 2–13.

\* cited by examiner

*Primary Examiner*—Stephen F. Gerrity
(74) *Attorney, Agent, or Firm*—John William Stader; Larry W. Miller

(57) ABSTRACT

A baler (10) for wrapping a rotating bale (52) of crop material (16) with strands of twine (72) has two twine tubes (68) through which the twine is fed so that ends of the strands dangle from the tubes. A bale density sensor (36) senses bale density and a controller (42) compares the sensed density with a desired density selected by an operator via an operator control panel (34). When the sensed density reaches about half the desired density the twine tubes are moved to a twine insert position so that the ends of the strands dangle adjacent the rotating bale. When a full bale has been formed, the controller automatically actuates a duckbill (60) to push the ends of the strands toward the bale where they are caught up in the crop material. If either strand is not caught up in the rotating bale, a new wrap cycle is automatically initiated. The twine tubes are moved to a twine cut position, the twine is cut, the twine tubes returned to the twine insert position, and the duckbill is again actuated to push the strand ends toward the bale.

9 Claims, 18 Drawing Sheets

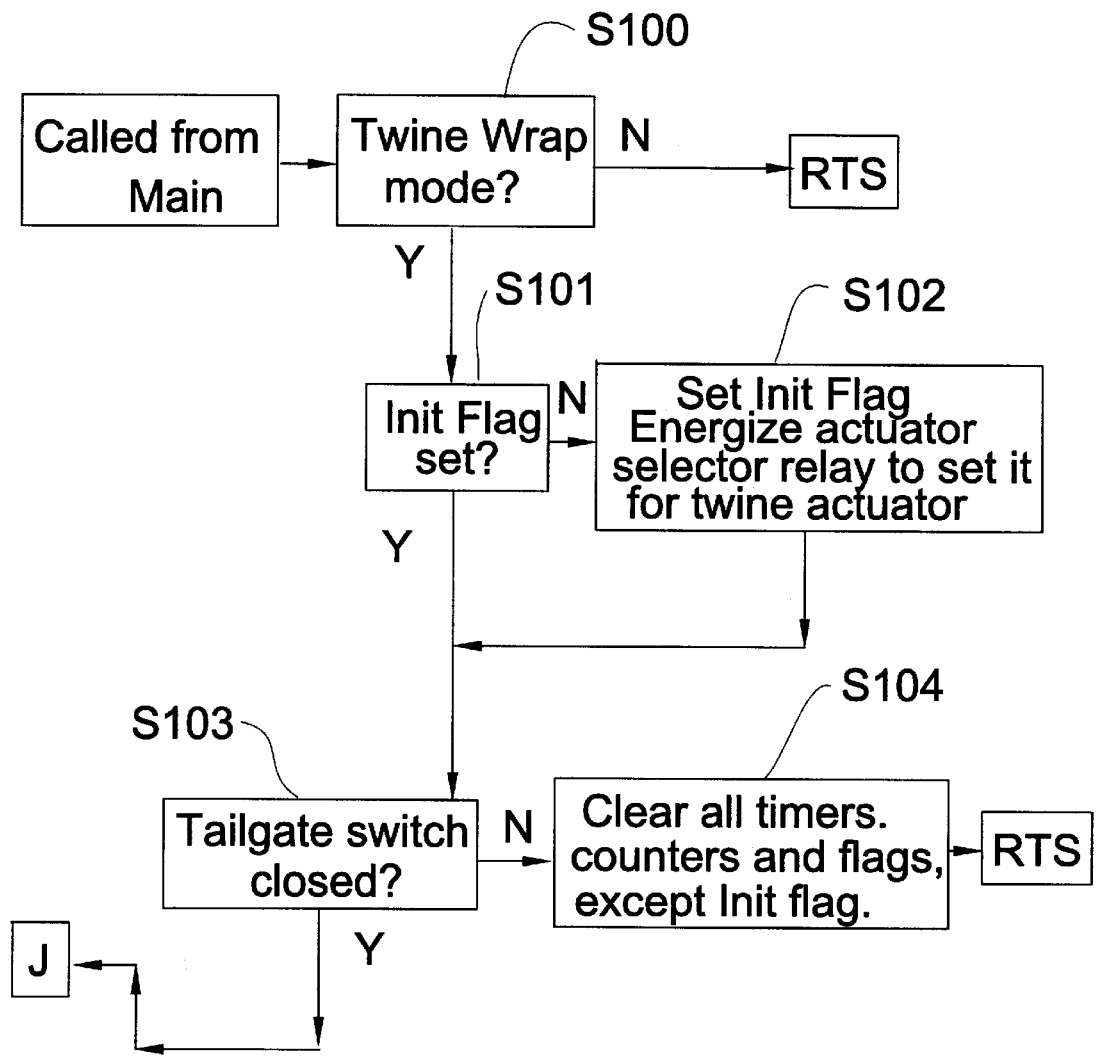

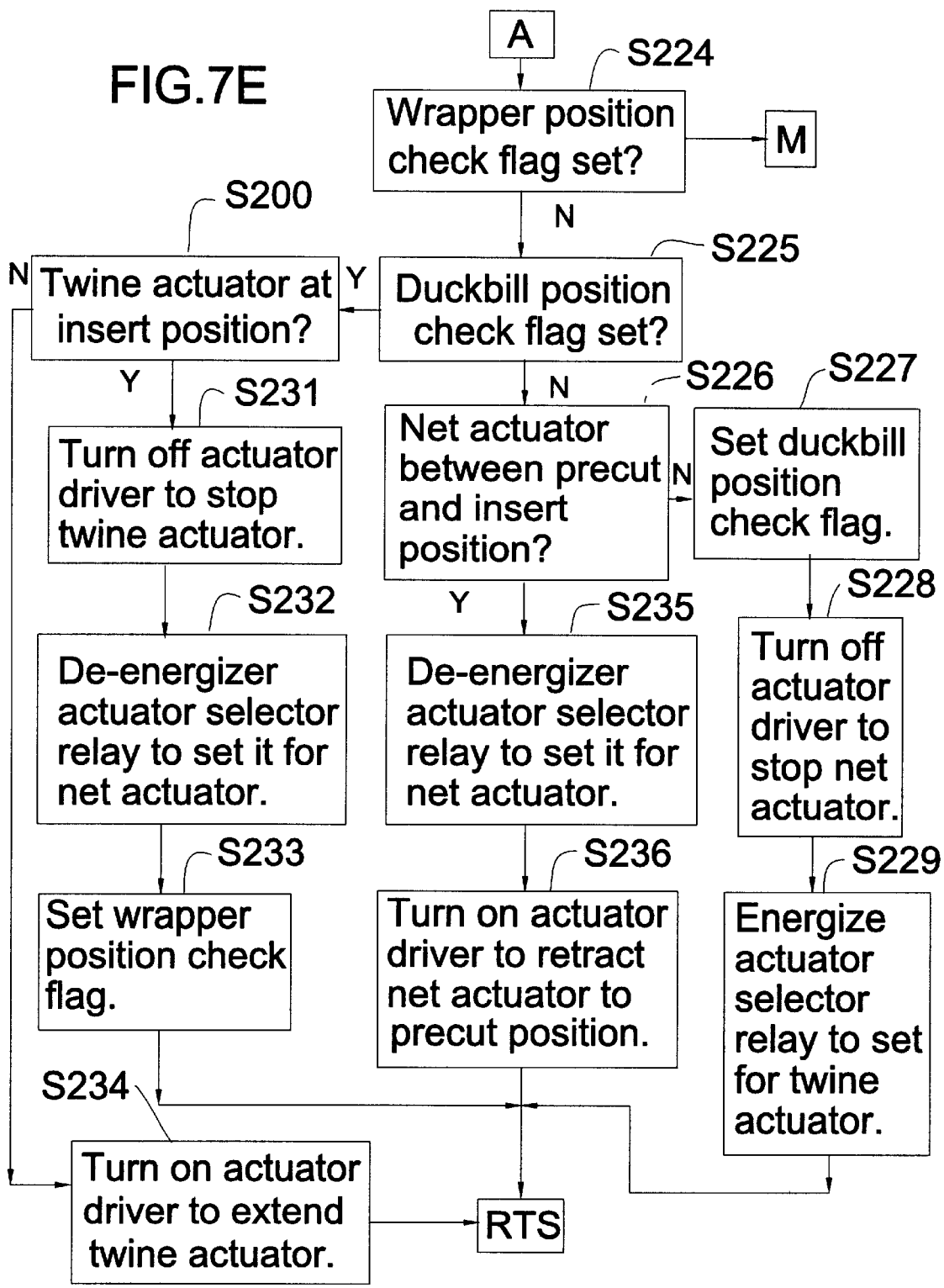

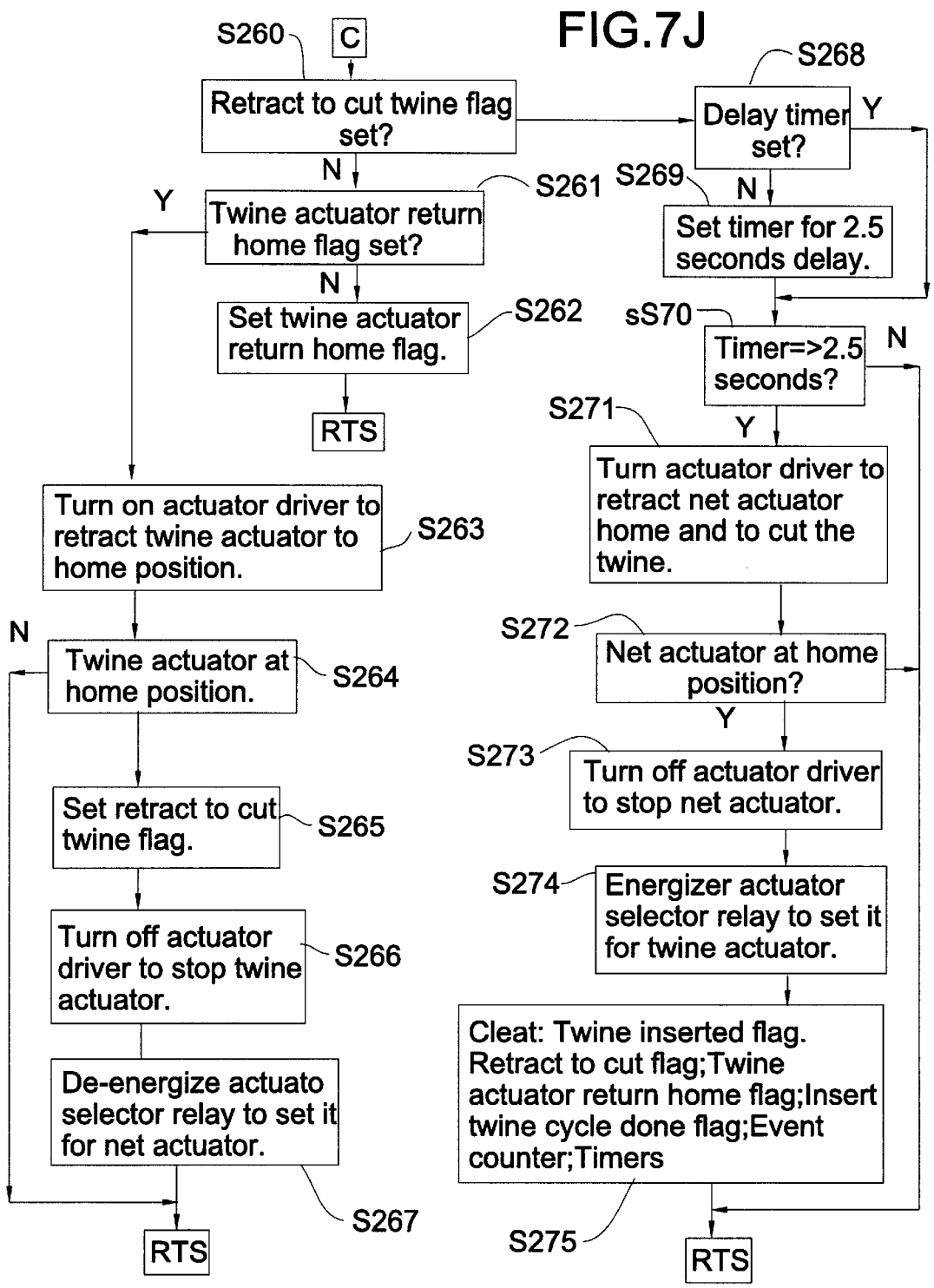

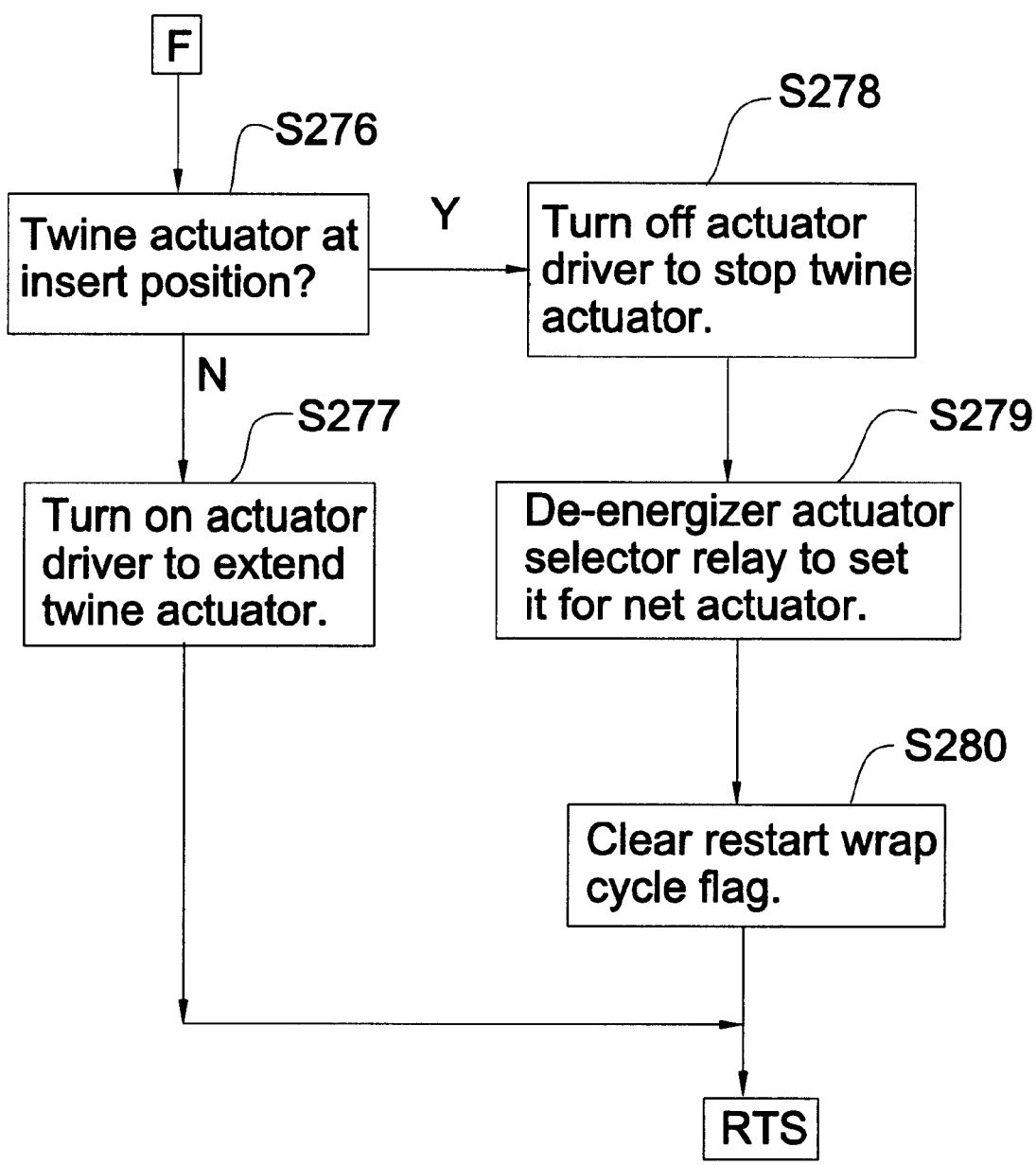

ROUND BALER TWINE WRAP CONTROL WITH AUTOMATIC RESTART

RELATED APPLICATIONS

This application is a continuation-in-part of co-pending application Ser. No. 09/362,723 filed Jul. 29, 1999, now U.S. Pat. No. 6,209,450, which claims the benefit of provisional application Serial No. 60/095,038, filed Aug. 3, 1998.

FIELD OF THE INVENTION

This invention relates to agricultural balers for forming round bales of crop material and automatically wrapping the bales with twine before releasing them onto a field. More particularly, the invention relates to improvements in the twine wrapper control system to (1) improve the chances that the end of the twine will be caught up in a rotating bale at the start of a wrapping cycle and (2) provide for automatic restarting of a wrapping cycle in the event the twine is not caught up.

BACKGROUND OF THE INVENTION

Typical automatic round balers, such as the models 544 and 5930 commercially available from New Holland North America, pick up crop material from a field and form it into a compacted round bale in a bale-forming chamber. When the bale has been compacted to a desired density (or reached a desired size), bale density (or size) sensors send signals to a controller which in turn sends a signal to an operator's panel to signal the operator to stop forward motion of the baler so that the bale may be wrapped with netting or twine according to a program of instructions stored in a controller memory.

After a brief delay allowing time for the operator to stop forward motion of the baler, the controller initiates a wrap cycle. The mechanism for wrapping with twine includes two hollow twine tubes. Two strands of twine are fed from two twine rolls through the tubes. When a wrap cycle is initiated, the twine tubes are moved arcuately to an extended or insert position with an end of one strand dangling from the end of a respective one of the tubes. A pusher mechanism, usually referred to as a "duckbill", is actuated to move the dangling ends toward the bale so that the ends of the twine strands are adjacent the bale near its lengthwise middle. The strands are caught up in the bale that is rotating within the bale-forming chamber. The bale is then wrapped in a pattern by moving the twine tubes toward a home position with programmed pauses at intervals to place circular wraps on the bale. The twine is cut after end wraps have been placed on the bale.

As the twine tubes move toward their home positions, each twine strand slides into a spring clamp and hold device so that the twine ends can not be caught up in moving machine parts after the strands are cut. The strands are then cut. Each strand is pulled out of its respective clamp and hold device at the beginning of the next wrap cycle as the twine tube arms are extended to the insert position.

It has been found that a frequent cause of failure in wrapping is due to the fact that the end of a strand does not drop quickly enough after being pulled free of its clamping device. As a result, the strand end drops onto the top of the duckbill rather than dangling in a position where it can be pushed toward the bale by the duckbill.

Hence there is a need for a system wherein the chance of failures in inserting the ends of the twine strands is considerably reduced.

A stored program in the controller determines the pattern in which the bale is wrapped. This program may be a factory-installed program, a "learned" program generated by manually controlling movement of the twine tubes to place the desired wrap pattern on a bale, or a factory-installed program which permits operator selection of the number of end wraps to be placed on a bale. In any event, the programs provide no easy method for restarting a twine wrap cycle to re-tie a bale in the event one or both strand ends are not caught up in the rotating bale.

Typically, the operator may wait until the selected twine pattern program completes its automatic wrap cycle and then restart the wrap cycle by actuating, for two seconds, a Wrap key on an operator's control panel. This procedure wastes a considerable amount of twine if one strand was caught up in the rotating bale. Alternatively, the operator may manually return the twine tubes to their home position by (1) actuating a Retract key on the operator's control panel to retract the twine tubes to their home position, (2) switching the controller to the net wrap mode by actuating a Net/Twine key, (3) again actuating the Retract key to return the duckbill to its home position and cut the twine, (4) actuating a Clear key to clear the error alarm and error message displayed on the operator's control panel (caused by interruption of the wrap cycle), (5) actuating the Net/Twine key to return the controller to the twine wrap mode, and (6) initiating a new wrap cycle by actuating the Wrap key for two seconds. This complex procedure requires a very skilled and knowledgeable operator and wastes considerable time. It also wastes twine if one strand is started but, as compared to the first procedure, results in less waste.

In copending application Ser. No. 09/362,723 the problems described above are solved by providing a control system for controlling the wrapping of bales of crop material, the control system being characterized in that, in the event of a malfunction during a wrapping cycle the twine is cut, the system restored to an initial state and a new wrapping cycle initiated by actuating a Wrap key on an operator's control panel.

SUMMARY OF THE INVENTION

An object of the present invention is to provide a round baler wherein, upon a failure in inserting an end of one of the wrapping twine strands, a new wrapping cycle may be initiated without the need for the operator to actuate the Wrap key. Provision is made for a limited number of attempts to insert the strands. If the strands are not properly inserted after a limited number of attempts, say three, an alarm is sounded and a wrapping fault message is displayed on an operator's control panel. In this case the operator may turn the power off, inspect the wrapping mechanism and, if need be, repair it, turn the power back on, and press a wrap key to initiate a new series of attempt to wrap the bale.

Another object of the invention is to provide a round baler wherein the twine tubes are moved to their twine insert positions prior to the time a full bale is formed, and an alarm is sounded and a bale wrap cycle automatically initiated when the bale reaches a preset size. The alarm signals the operator to stop forward motion of the baler. It is not necessary for the operator to press the wrap key in order to initiate the wrap cycle.

A further object of the invention is to provide a bale wrapping system for wrapping a rotating bale of crop material with at least one strand of twine, the bale wrapping system comprising: at least one twine dispensing arm for presenting at least one strand of twine so that an end of the strand may dangle from the arm, the arm being movable between a home position and a twine insert position where the end of the strand dangles adjacent the rotating bale; a twine pusher movable between a first position at which it cuts the strand and a second position at which it pushes the dangling end of the strand toward the rotating bale; a bale sensor for sensing a bale parameter which increases as the rotating bale is being formed so as to reach a desired value when the rotating bale is fully formed; a controller responsive to the bale sensor for controlling a bale wrapping cycle during which the controller controls the twine dispensing arm to move from the home position to the twine insert position, the controller being responsive to the bale sensor for controlling the twine pusher to push the dangling end of the strand toward the rotating bale; and, a twine motion sensor for sensing motion of the strand when the dangling end is caught up in the rotating bale; the controller being responsive to the twine motion sensor when the dangling end is not caught up in the rotating bale to automatically abort the bale wrapping cycle and initiate a new bale wrapping cycle. In a preferred embodiment, two twine dispensing arms are provided for dispensing two twine strands.

The controller aborts the bale wrapping cycle by returning the twine dispensing arm(s) to the home position and returning the twine pusher to the first position to cut the strand(s), the controller initiating the new bale wrapping cycle by again moving the twine dispensing arm(s) to the insert position and moving the pusher to the second position.

Yet another object of the invention is to provide a bale wrapping system as described above and further comprising an audible alarm, the controller energizing the audible alarm when N consecutive new bale wrap cycles are aborted because the dangling end(s) of the strand(s) is/are not caught up in the bale, N being an integer greater than zero.

According to one aspect of the invention, a wrap cycle is automatically initiated when a full bale has been formed. It is not necessary for the operator to press a wrap key to initiate a wrapping cycle.

Other objects and advantages of the invention will be evident from the following description and the accompanying drawings.

BRIEF DESCRIPTION OF THE DRAWINGS

FIGS. 7A–7K comprise a flow diagram illustrating program steps of a bale wrap routine executed by a controller according to the invention;

DETAILED DESCRIPTION OF THE INVENTION

Figure 1:
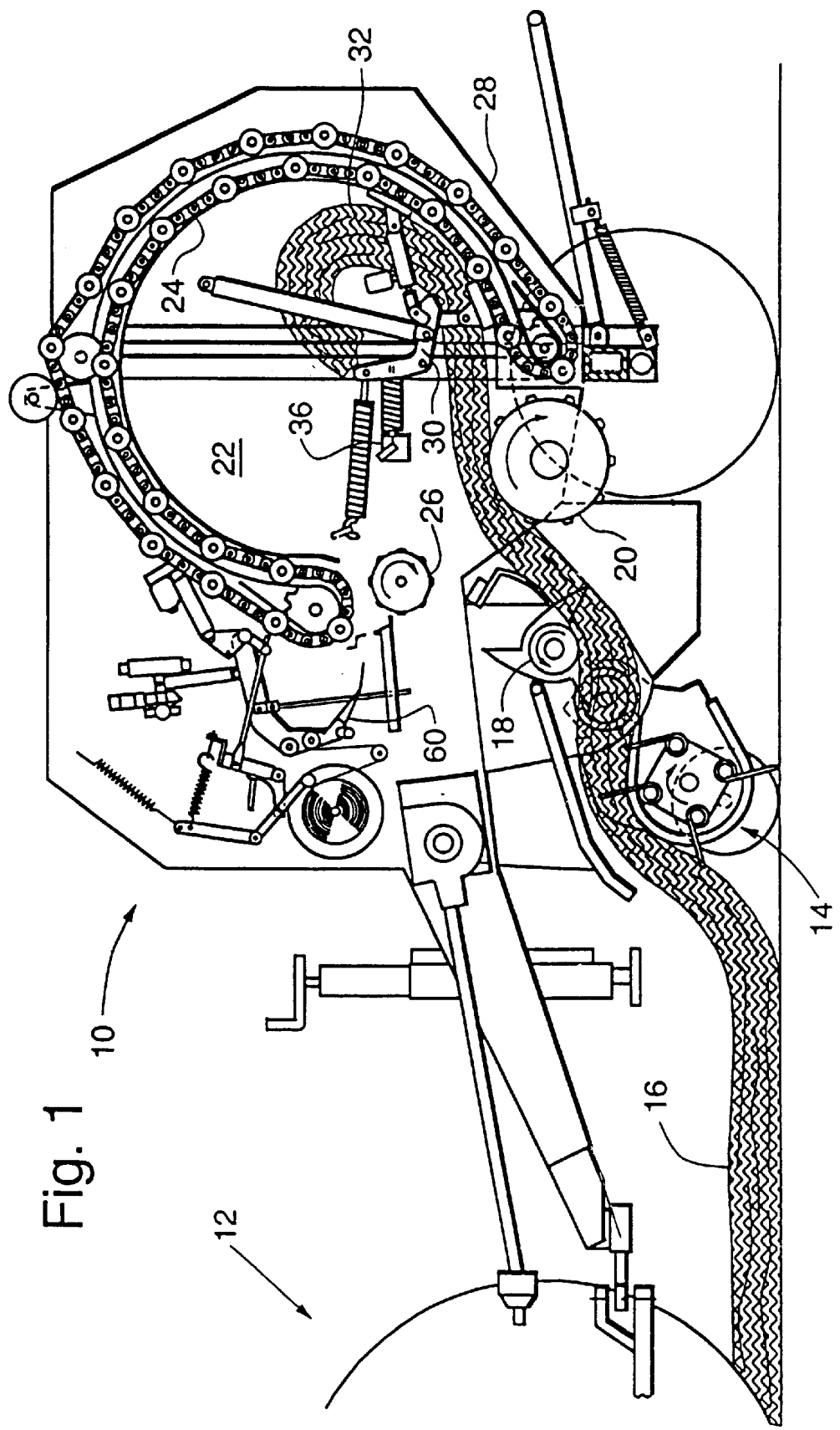
FIG. 1 is a schematic side elevation view of a round baler.

FIG. 1 schematically illustrates a baler 10 such as the New Holland model 544 automatic round baler which is adapted to be pulled by, and powered from, a tractor 12. A pickup assembly 14, having cross conveying augers (not shown), picks up crop material 16 and feeds it via a feed rotor 18 and a rotating floor roll 20 into a bale-forming chamber 22. Within chamber 22, the crop material at first curls freely under the combined action of the floor roll 20, a chain conveyor 24 and a rotating stripper roll 26, and packs loosely under its own weight until chamber 22 is filled. As more crop material is fed into the chamber the crop material is compacted and exerts a force against a tailgate 28 tending to open the tailgate. The tailgate is hooked up by a tailgate latch 30 attached to the main frame of the baler and a density cylinder 32 is attached to the tailgate. The tailgate is allowed to release slightly but is still held in latch 30 so that pressure exerted on the tailgate by the bale pulls on and extends cylinder 32 against the pressure in the gas accumulator on the cylinder. The baler is provided with two latch sensor switches 31, 33 (FIG. 6), one switch at each side of the baler, to detect when the tailgate is latched.

Figure 8:
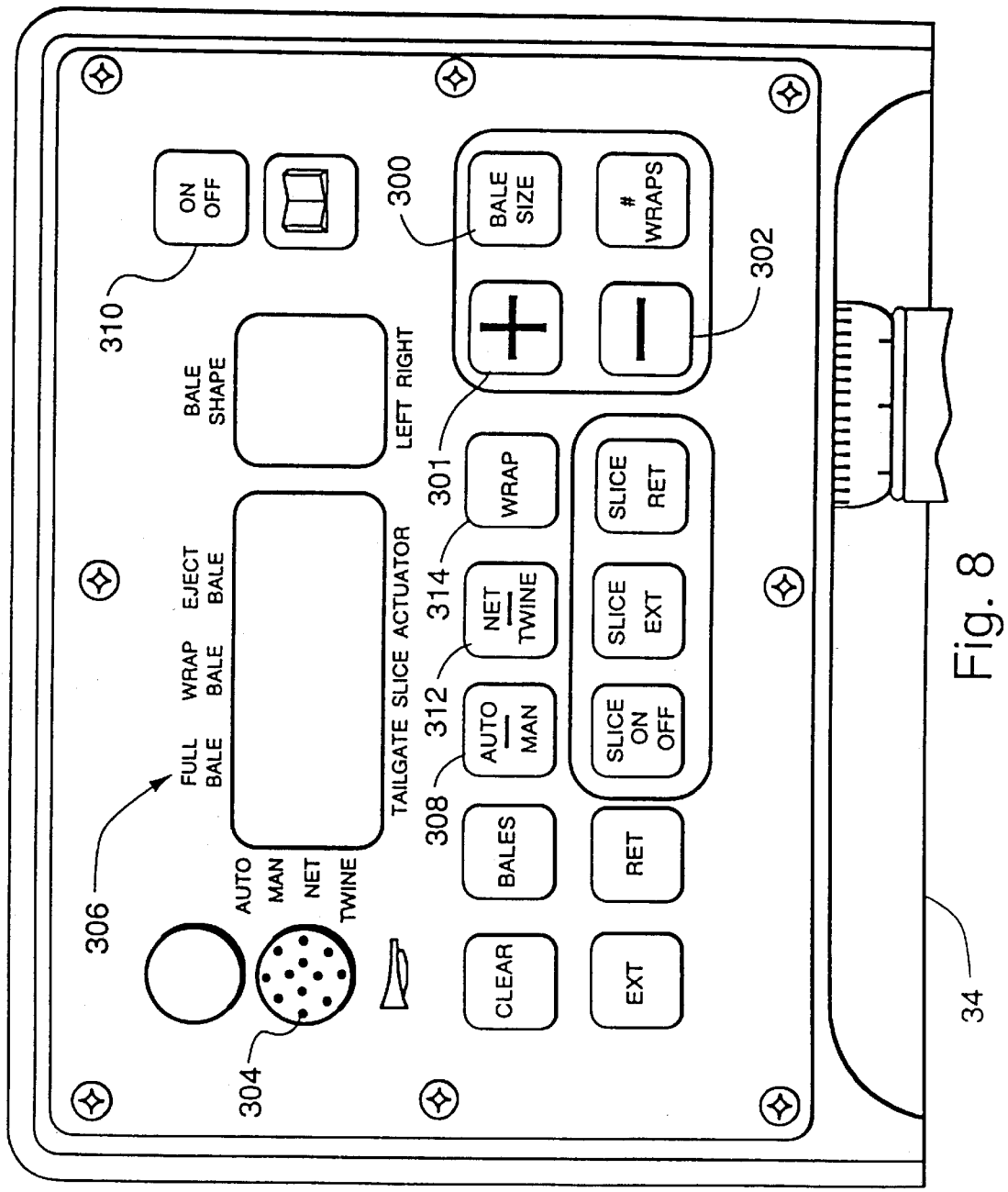
FIG. 8 shows the operator control panel.

A bale parameter value, indicating a full or complete bale, is set by an operator by actuating Bale Size, "+" and "−" keys 300, 301 and 302 on an operator's keyboard or control panel 34 (FIG. 8). This parameter may be bale size but preferably is bale density. Two bale parameter sensors 36 are provided, one at each side of the baler, for sensing a bale parameter. The sensors include respective potentiometers 38, 40 (FIG. 6) for producing analog electrical signals indicating the sensed density. A controller 42 includes a microprocessor 46 which first converts the analog signals to digital values and then compares the sensed density with the desired bale density. When the two are equal the operator is signaled to stop forward motion of the baler by energizing an audible signal generator 304 and a "full bale" indicator light 306 on the operator's control panel 34.

The controller waits a short interval (say 0.75 second) to allow the operator time to stop forward motion of the baler and then automatically initiates a bale wrapping cycle to wrap the bale with net or twine depending on which wrapping material the operator has selected by operation of a Net/Twine key 312 (FIG. 8). The term "twine" as used herein means any suitable strand-like material such as conventional twine, plastic material and wire.

Figure 6:
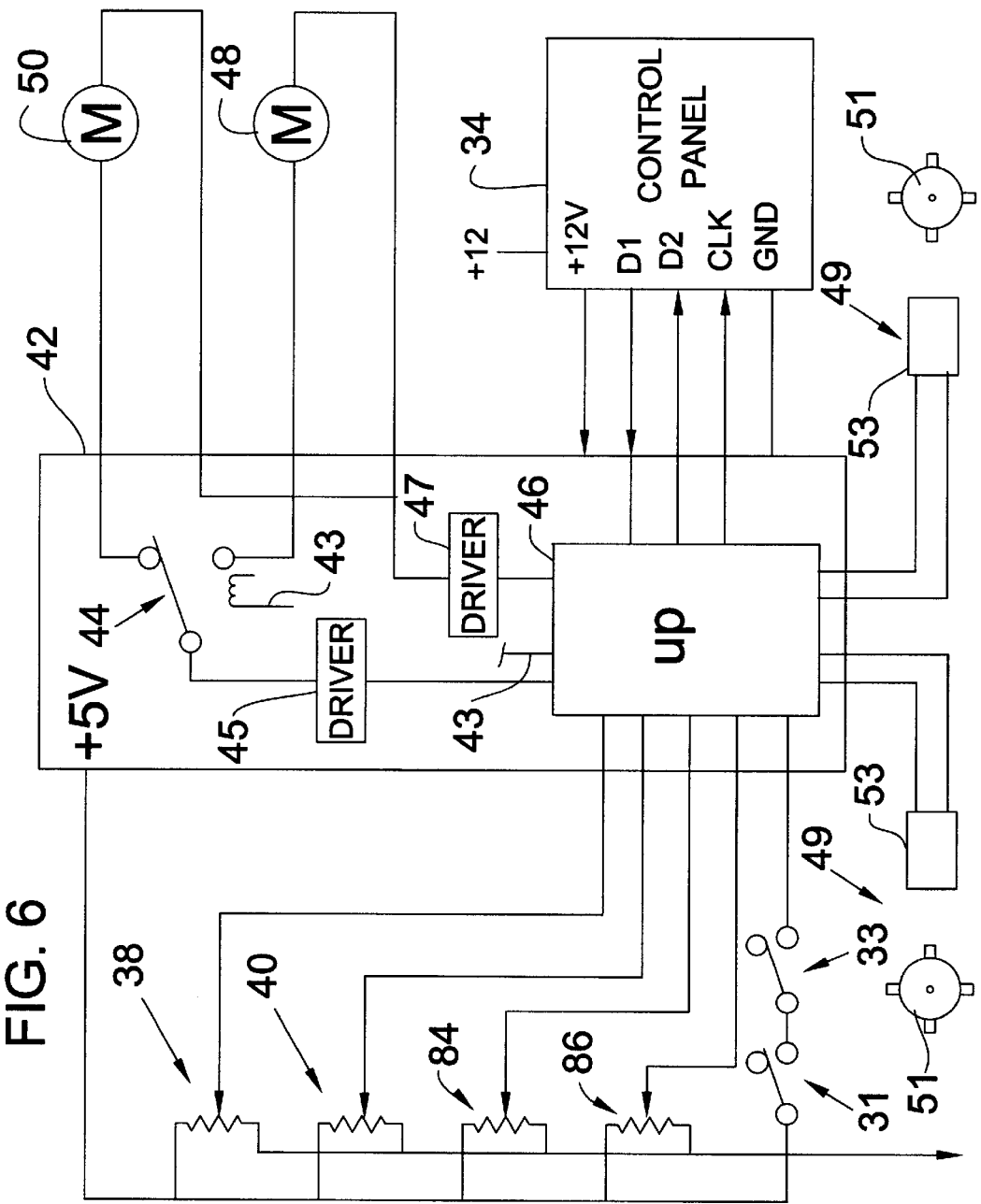
FIG. 6 is a circuit diagram illustrating components of the electrical control system for the baler, the diagram showing only those components necessary for implementing the present invention.

FIG. 6 shows only those details of the baler control circuit relevant to wrapping with twine.

The controller 42 includes a converter circuit (not shown) for converting a +12V battery voltage to +5V for powering the microprocessor, the source voltage being routed to the converter through an on/off switch controlled from an On/Off key 310 on the operator's control panel 34.

The controller 42 also includes an actuator selector relay 44 and driver circuits 45 and 47 controlled by microprocessor 46 to selectively energize a bi-directional twine wrap actuator drive motor 48 or a bi-directional net wrap actuator drive motor 50. Relay 44 and drivers 45 and 47 provide a current for driving either motor in two opposite directions.

Left and right twine motion sensors 49 are provided for sensing motion of the left and right twine strands, respectively as a bale is being wrapped. Each motion sensor 49 includes a toothed gear 51 that is rotated when a twine strand moves. At least the teeth of gears 51 are made of metal (steel) so that rotation of the gear may be sensed by a magnetic sensor 53. The sensors provide signals to the microprocessor 46 to indicate when the twine strands are "running" or in motion.

The microprocessor 46 is conventional and typically includes ROM, RAM and EPROM memories and an analog to digital converter in addition to a digital processor. The microprocessor is connected to the operator's control panel by three leads, one lead (CLK) carrying clock pulses to the control panel, one lead (D2) carrying data signals to the control panel and one lead (D1) carrying data signals from the control panel to the microprocessor. The microprocessor periodically samples lead D1 to determine if any key has been actuated and stores a flag or indication in a register or memory when a key is actuated.

Figure 2:
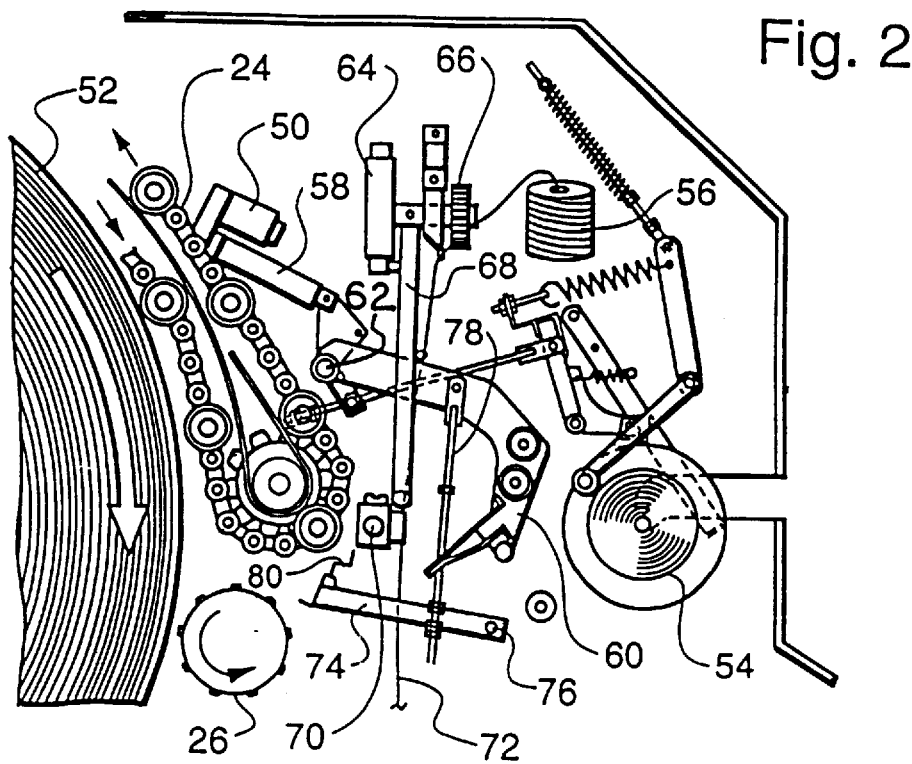
FIG. 2 schematically illustrates the mechanism for feeding and inserting net and twine, as viewed from the right side of the baler, the mechanism being shown in a home position.
Figure 3:
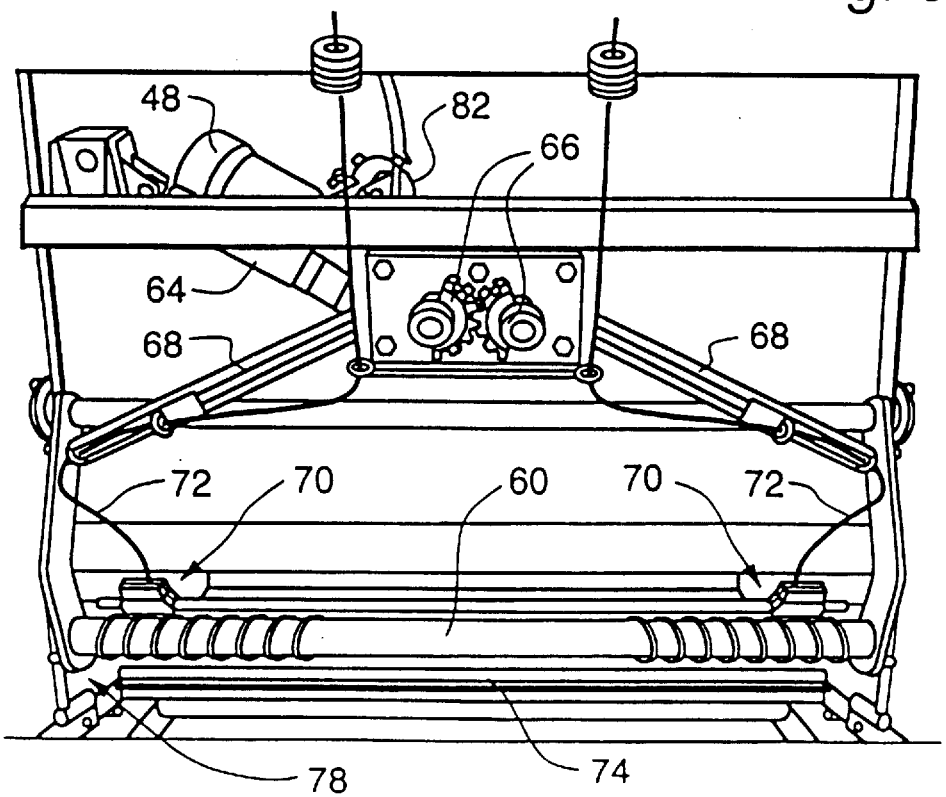
FIG. 3 is a view showing the twine tubes and the twine clamp and hold devices as viewed looking toward the front of the baler, the twine tubes being shown in a home position.

FIGS. 2 and 3 illustrate the wrapping mechanism for wrapping a rotating bale 52 with net from a supply roll 54 or with twine from two supply rolls 56, only one of the supply rolls being visible in FIG. 2. The wrapping mechanism comprises a net wrap actuator 58 driven by the net wrap actuator drive motor 50, a pusher or duckbill 60 mounted on a pivot 62, a twine wrap actuator 64 driven by the twine wrap actuator drive motor 48 (FIG. 6), and two twine dispensing arms 68, illustrated as hollow twine tubes driven by actuator 64 via gearing 66. The wrapping mechanism further includes two spring clamp and stop devices 70 for releasably gripping a respective strand of twine 72, a knife assembly 74 pivoted at 76 and connected to duckbill 60 by a linkage 78, and a shear bar 80 cooperating with knife assembly 74 to cut the twine. The clamp and stop devices are adjustable laterally as viewed in FIG. 3 to thereby adjust the location of end wraps of twine placed on the bale 52.

A sensor 82 (FIG. 3) is mounted on the twine wrap actuator 64 and includes a potentiometer 84 (FIG. 6) for producing a signal indicating the position or extension of the twine wrap actuator. In like manner, a potentiometer 86 (FIG. 6) is provided for producing a signal indicating the position or extension of the net wrap actuator 58.

Figure 4:
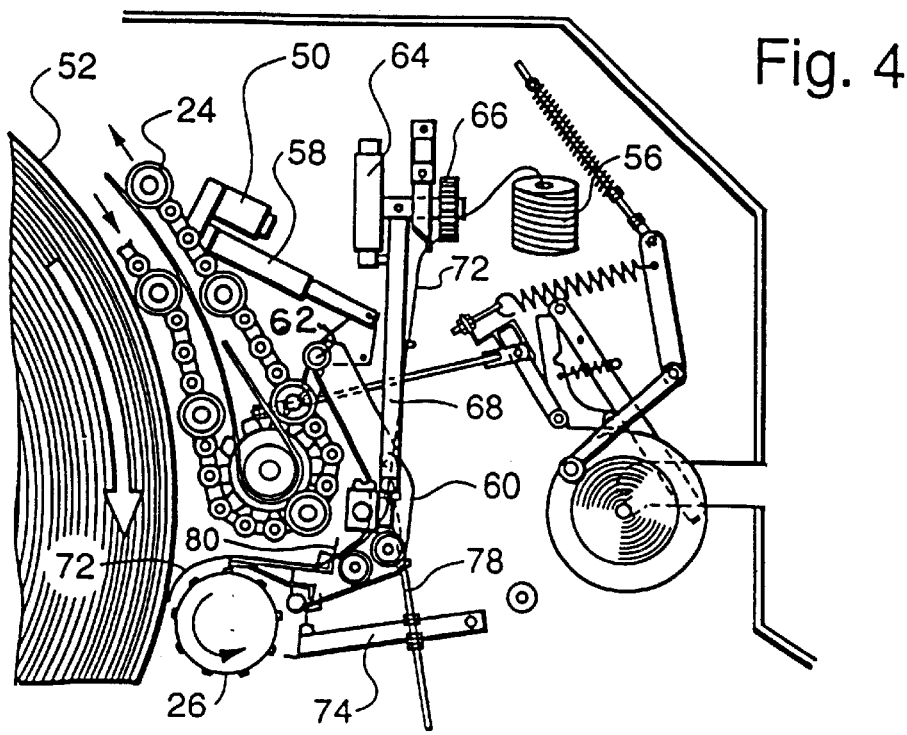
FIG. 4 is a view similar to FIG. 2, the mechanism being shown in a twine insert position.
Figure 5:
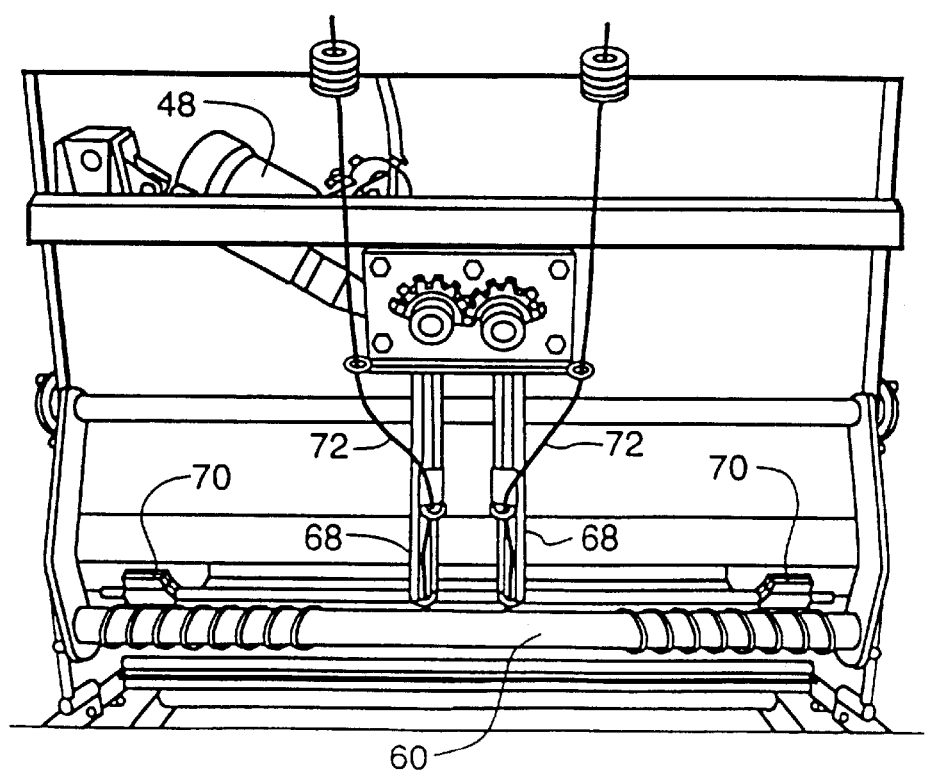
FIG. 5 is a view similar to FIG. 3, the twine tubes being shown in the twine-inserting position.

FIGS. 2 and 3 illustrate the wrapping mechanism in the "home" position, that is, when the net wrap actuator 58 and the twine wrap actuator 64 are fully retracted. FIGS. 4 and 5 show the wrapping mechanism in a twine inserting position with both actuators fully extended so as to present dangling ends of the twine strands to a rotating bale.

The twine wrap actuator 64 is extended prior to the time a complete bale is formed. The twine wrap actuator drives the twine tubes 68 from the home position (FIG. 3) to a twine inserting position (FIG. 5). The twine strands are pulled free of the clamp and stop devices so as to dangle freely from the ends of the tubes. After the bale has been completely formed and the operator has been signaled to stop forward progress of the baler, the net wrap actuator 58 is extended. As the net wrap actuator extends, it pivots duckbill 60 clockwise from the position shown in FIG. 2 to that shown in FIG. 4. The duckbill, via linkage 78, pivots the knife assembly 74 counter-clockwise so that the knife assembly is spaced from the shear bar 80. Further pivoting of the duckbill 60 causes it to engage the dangling twine strands 72, pushing them over the rotating stripper roll 26. The strands are caught up in the rotating bale and begin to wrap around the bale.

After a programmed dwell time allowing the strands to be caught up, the net wrap actuator is retracted to a "precut position". In this position the duckbill 60 is clear of the twine strands but the knife assembly 74 is still spaced from the shear bar 80.

The twine wrap actuator 64 dwells at the fully extended position for a programmed interval of time to place a programmed number of circular wraps on the center of the bale. The twine wrap actuator is then retracted toward its home position, pausing as specified by the program to place circular wraps on the bale. As the twine wrap actuator approaches its home position the twine strands 72 slide into the clamp and stop devices and a programmed number of end wraps are placed on the bale. After a programmed lapse of time to permit placement of the end wraps, the net wrap actuator 58 is retracted from its precut position to its home position. Movement of the actuator pivots the duckbill 60 causing linkage 78 to pivot knife assembly 74 clockwise and into contact with shear bar 80 thereby cutting the strands. This completes the wrapping cycle. The bale is ready for dumping from the baler by opening the tailgate 28, and the twine wrapping mechanism is again in the positions illustrated in FIGS. 2 and 3.

The microprocessor 46 executes a Main routine (not shown) every 32.77 ms to control various functions or operations of the baler. On each execution, the Main routine calls a Bale Density routine illustrated by the flow diagram shown in FIGS. 9A and 9B, and then calls a Bale Wrap routine illustrated in FIGS. 7A-7J. The Bale Density routine will be described first, followed by a description of the Bale Wrap routine. In describing each routine, the assumption is made that initially power is off, the bale-forming chamber is empty, and the baler is not moving.

Bale Density Routine

Figure 9A:
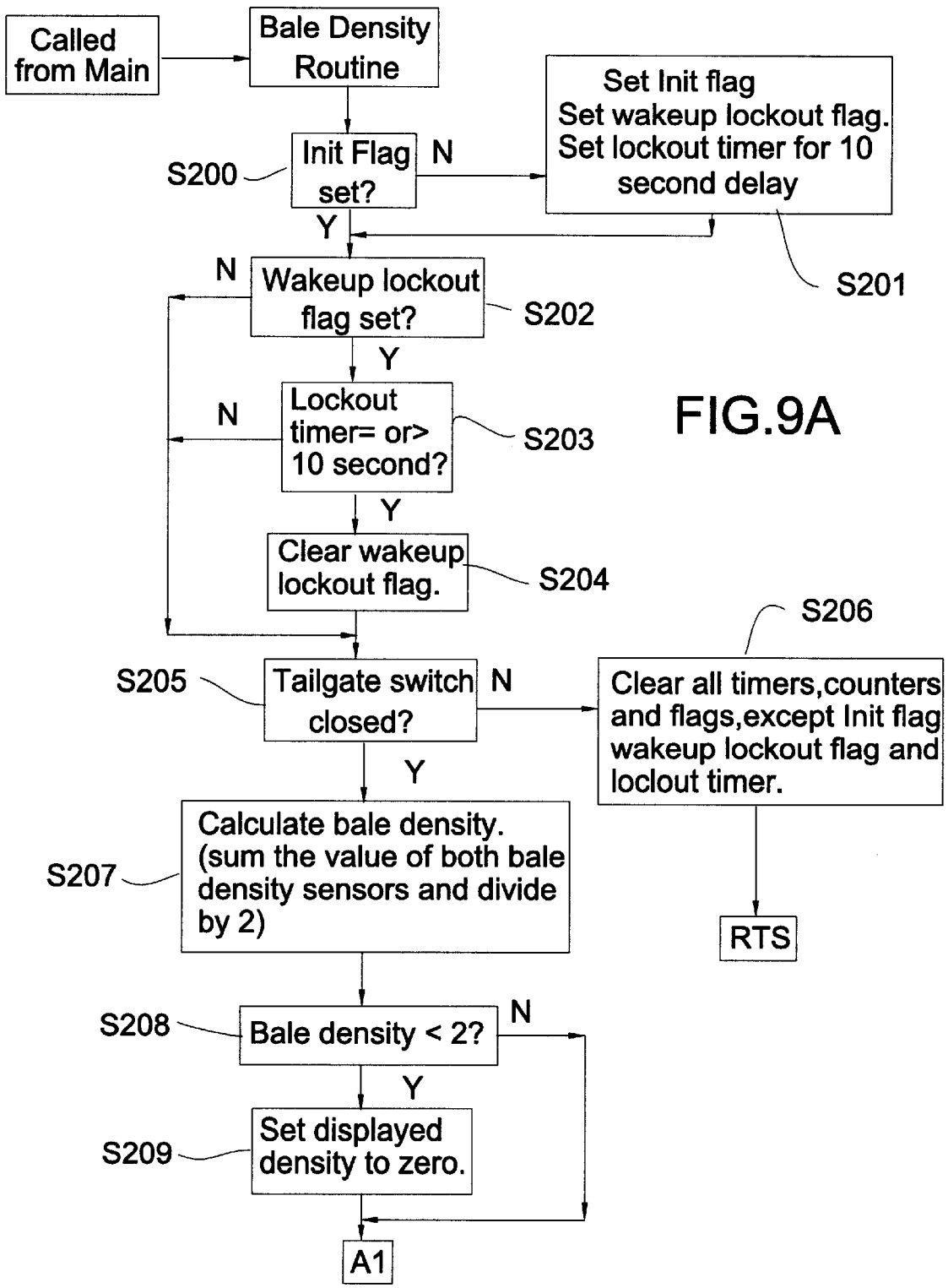
FIGS. 9A and 9B comprise a flow diagram illustrating program steps of a bale density routine.

Referring to FIG. 9A, at wake-up, that is, when power is turned on, microprocessor 46 begin executing the Main routine and calls the Bale Density routine. At S200 (step 200) an Initialize Flag is tested. Initially, this flag is in its reset state so the routine moves to S201 which sets the Initialize Flag, sets a Wake-up Lockout Flag and resets a free running Lockout Timer to begin timing an interval of 10 seconds. Next, the Wakeup Lockout Flag is tested at S202 and since the flag has just been set, the Lockout Timer is tested at S203 to see if 10 seconds have elapsed. Initially, the timer will not have timed a 10-second interval so the routine advances to S205 where the tailgate latch switches are tested to determine if the tailgate is closed.

If S205 determines that the tailgate is not closed, S206 clears all timers, counters and flags used in the routine except the Initialize Flag, Wakeup Lockout Flag, and Lockout Timer. The program then returns to the Main Routine.

If S205 determines that the tailgate is closed, the bale density is calculated and displayed on the operator's control panel shown in FIG. 8. The calculation is done at S207 by taking the average of the two digitized values represented by the analog inputs from potentiometers 38 and 40 (FIG. 6).

Figure 9B:
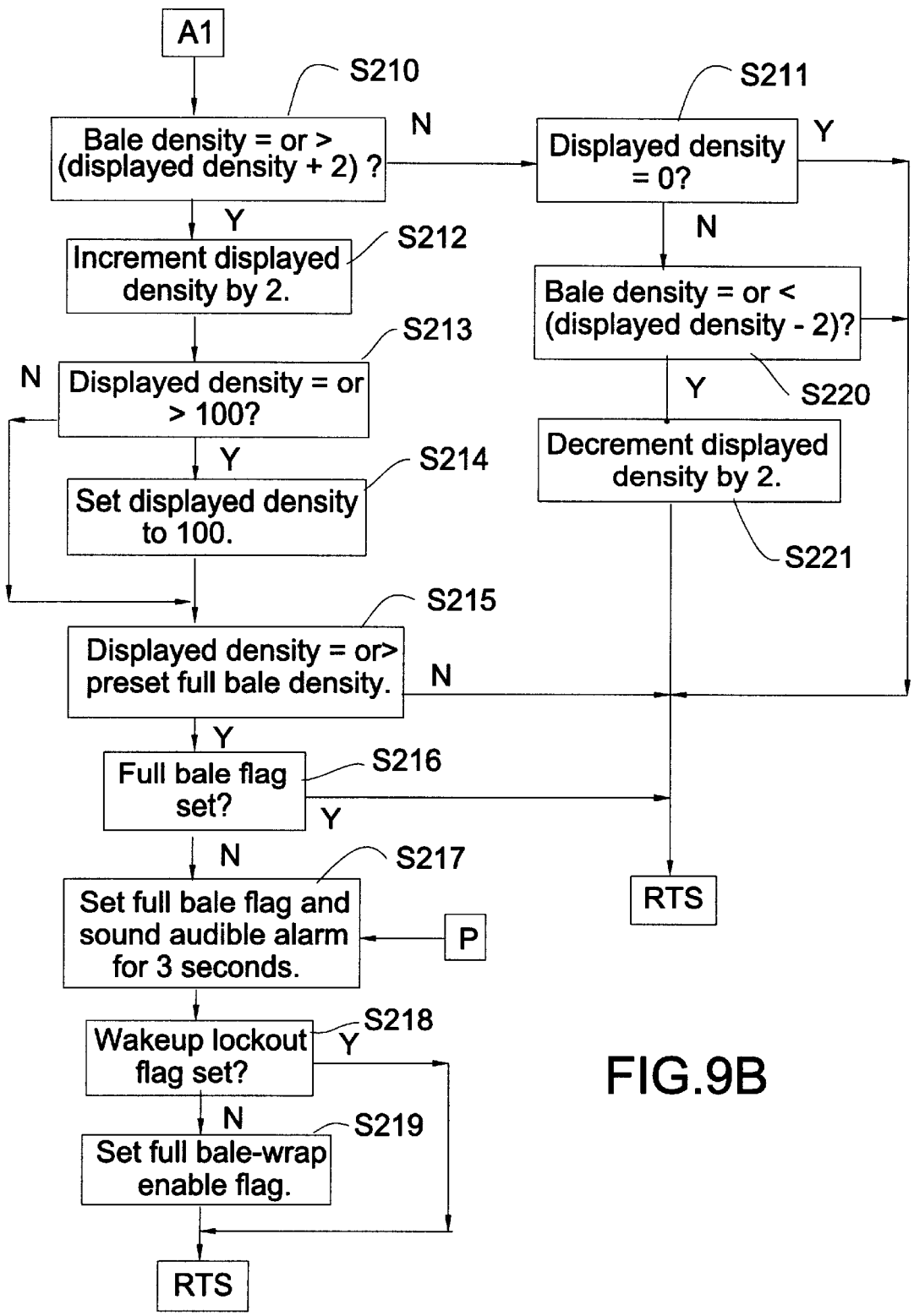

The bale density calculated at S207 is compared with the value 2 at S208. Assuming initially that there is no full or partial bale in the bale-forming chamber, the computed bale density is zero so the routine sets the density displayed on the operator's control panel to zero at S209 before advancing to S210 (FIG. 9B).

S210 compares the computed bale density with a value equal to the currently displayed density plus 2. Since the computed and displayed densities are both zero, S211 tests the currently displayed density value for zero. Since S207 set this value to zero, the Bale Density routine returns to the Main routine from S211 with a zero bale density value being displayed on the operator's control panel.

When the baler is moved over a field so that crop material is accumulated in the bale-forming chamber, the bale density calculated at S207 increases. When the computed bale density exceeds 2, this is detected at S208 so that S209 is skipped each time the routine is executed. At S210 the computed bale density will be greater than the displayed bale density so the value for setting the display density is incremented by 2 at S212.

The incremented value is tested at S213 to determine if it exceeds 100, the maximum bale density value that may be selected by the operator via keys 300–302 on the operator's control panel. If the incremented value is 100 or greater, the display is set at S214 to display the value 100. If the incremented value is less than 100, then the incremented value obtained at S212 is used to energize the display.

S215 compares the displayed density value with a preset full bale density value selected by the operator via control panel keys 300-302. A return is made to the Main routine if the bale has not reached the selected density. On the other hand, if the bale has reached the selected density a Full Bale Flag is tested at S216. This flag has not been set so it is set at S217 and an audible alarm is sounded for a short interval on the order of 3 seconds to alert the operator that a full bale has been formed.

S218 tests the Wakeup Lockout Flag. This flag is set at S201 at wakeup and remains set for 10 seconds as previously described. If the 10-second interval has not expired, wrapping of the bale can not begin. In this case a return is made to the Main routine. If the 10 seconds has elapsed, a Full Bale Wrap Enable Flag is set at S219 before returning to the Main routine. This flag is tested in the Bale Wrap routine.

On each execution of the Bale Density routine after the Full Bale Flag is set at S216, the routine returns to the Main routine thus skipping S217-S219.

Generally speaking, as a bale is being formed, the bale density value displayed on the control panel is incremented in steps of 2. However, because bale density is measured by potentiometers mechanically driven by compressible crop material through a mechanical linkage, a precise measurement of bale density is not possible. Thus, as a bale is being formed a bale density calculated at S207 may be less than a previously calculated density for the same bale, thus requiring decrease in the displayed density value. S220 detects when the calculated density is at least two less than the displayed density and S221 decrements the displayed density by two.

Bale Wrap Routine

Figure 7B:
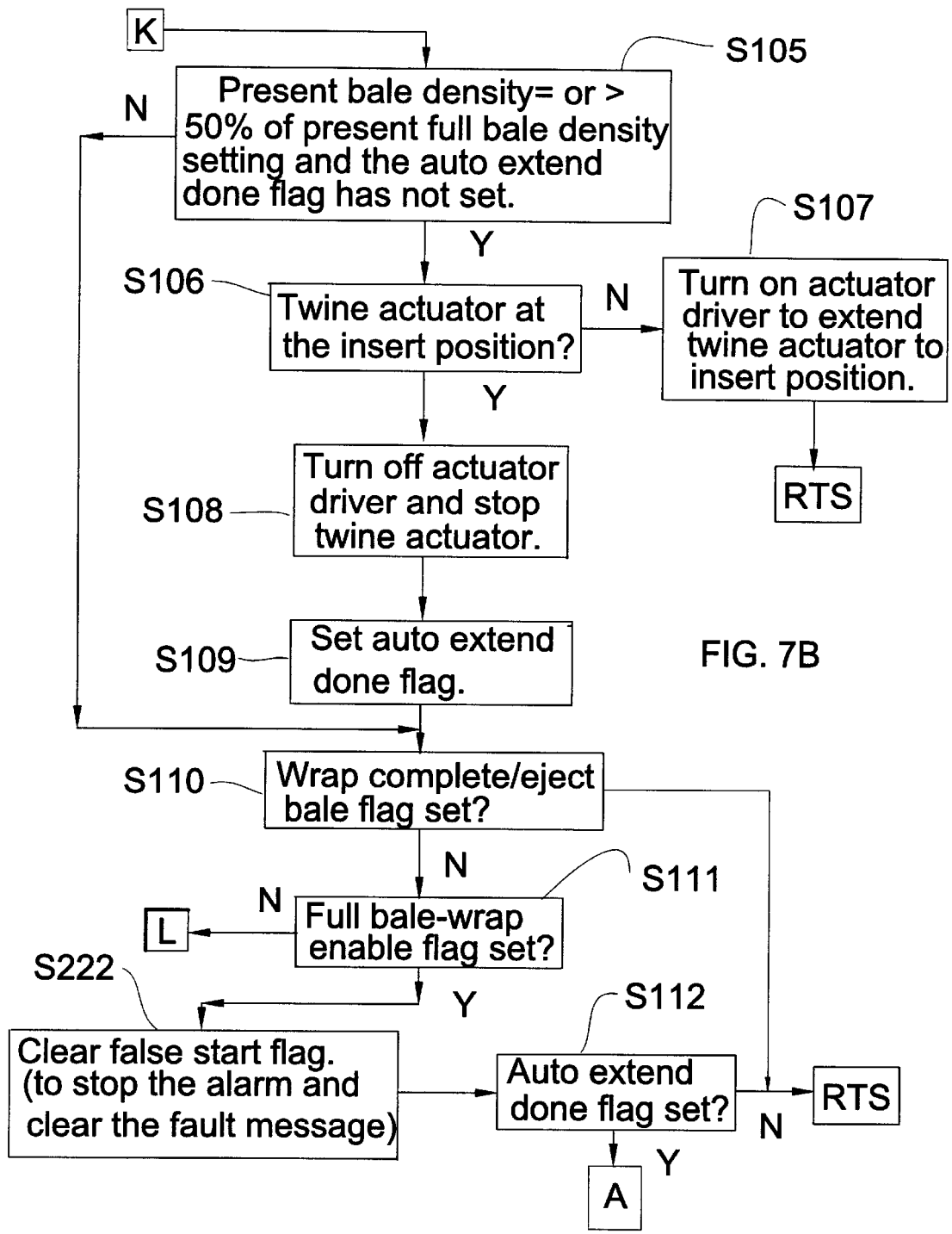

FIGS. 7A–7J comprise a flow diagram of the Bale Wrap routine executed by microprocessor 46 to cycle the net and twine wrap actuators as described above and, in the event one or both twine strands 72 are not caught up in the bale, immediately terminate the wrapping cycle. In FIG. 7A, a test is made at S100 to determine if the operator has operated Net/Twine key 312 so as to select the twine wrap mode. If not, a return is made to the Main routine but if the twine wrap mode has been selected an Initiate Flag is tested at S101.

On the first execution of the routine after the system is powered up, an Initiate Flag will be in the reset condition when tested at S101. The flag is set at S102 and the actuator selector relay 44 (FIG. 6) is energized to select the twine wrap actuator motor 48 (FIG. 6) for activation. However, drivers 45 and 47 are not enabled to drive the motor.

At S103 the tailgate switches 31,33 are tested and if the tailgate is open all flags used in the wrap routine, except the Initiate Flag, and various, counters and timers used in the routine are reset or initialized at S104 before a return is made to the main routine. Thereafter, S100, S101, S103 and S104 are repeated until the tailgate is closed.

On the first execution of the routine where S103 determines that the tailgate is closed, the program advances to S400 (FIG. 7C) where a Wrapping Fault Flag is tested. This flag is only set when a wrapping fault occurs. Assuming for the present that no wrapping fault has occurred, the program next checks for twine motion. The left and right twine motion sensors 49 (FIG. 6) provide input signals to set left and right twine motion sensor registers, L_TM and R_TM in microprocessor 46, when the left and right twine strands, respectively, are moving. L_TM is tested at S401 and a Left Twine Running Flag L_TR is either cleared at S402 or set at S403 depending on whether L_TM is cleared or set. R_TM is tested at S404 and a Right Twine Running Flag R_TR is either cleared at S405 or set at S406 depending on whether R_TM is cleared or set. The twine strands should be motionless at system wake-up and since L_TM are R_TM, cleared at S102, the flags L_TR and R_TR are reset at S403 and S405, respectively.

Next, the Full Bale Wrap Enable Flag is tested at S407 for a set condition. This flag is set in the Bale Density routine when a bale has reached full size and then only if 10 seconds have elapsed since system wake-up. Assuming the flag has not been set, S408 tests to determine if the Wrap key 314 was pressed by the operator to initiate a bale wrap cycle. The formation of a bale has not yet begun so the Wrap key should not have been actuated. A Wrap Key Timer is cleared at S409 and the routine moves to S105 (FIG. 7B).

S105 tests an Auto Extend Done Flag and also compares the present bale density computed in the Bale Density routine with a density value equal to 50% of the bale density value selected by the operator.

The Auto Extend Done Flag has not been set. However, the present bale density will be less than 50% of the operator selected bale density so the routine jumps from S105 to S110 which tests a Wrap Complete/Eject Bale Flag to determine if it has been set. This flag has not yet been set so the Full Bale-Wrap Enable Flag is tested at S111 to determine if it has been set. This flag has not been set so the program advances to FIG. 7d where the Left Twine Running Flag is tested at S410 and the Right Twine Running Flag is tested at S411. The twine strands should not be running at this time. S412 clears a False Start Flag and also clears the display 306 of any false start messages before a return is made to the Main routine.

If S410 or S411 should determine that the Left or the Right Twine Running Flag is set, the display 306 is energized at S413 to indicate a left twine fault or energized at S414 to indicate a right twine fault. If S413 or S414 is executed then S415 is executed to set a False Start Flag that causes the sounding of an audible alarm and the display of a fault message on the display 306. A return is then made to the Main routine.

Assume now that the baler is pulled over a field so that formation of a bale begins. Eventually the bale density reaches 50% of the bale density selected by the operator. This condition is detected at S105 (FIG. 7b) and since the Auto Extend Done Flag is not set the routine advances to S106 where the output of the twine actuator sensor potentiometer 84 is sampled to determine if the twine actuator 64 is extended to the twine insert position. Since the twine actuator is still in the home position, S107 is executed to set drivers 45 and 47 to energize the twine actuator drive motor 48 to begin moving the twine actuator toward the twine insertion position. The routine then returns to the main routine.

Although S105 tests for 50% of the desired or preset density this factor is not critical. However, movement of the twine tubes to the twine insert position should be initiated early enough so that the ends of the twine strands are positioned adjacent the rotating bale before the bale density reaches the desired density.

As the twine actuator moves toward the twine insertion position the Bale Wrap routine continues to execute. When the twine actuator reaches its twine insertion position, this is detected at S106 and at S108 the drivers 45,47 are turned off. The Auto Extend Done Flag is turned on at S109 and the Wrap Complete/Eject Bale Flag is tested at S110. Since the Wrap Complete/Eject Bale is still reset, the routine advances to S111 and continues as previously described.

When the bale density reaches the bale density preset by the operator, the Bale Density routine sets the Full Bale/Wrap Enable Flag at S219 in FIG. 9B. On the next execution of the Bale Wrap routine, the test at S111 detects that the flag is set. A False Start Flag is cleared at S222 (it has not been set) and the Auto Extend Done Flag is tested at S112. Since this flag was set at S109, the routine advances to S224 and S225 (FIG. 7E) to test a Wrapper Position Check Flag and a Duckbill Position Check Flag for a set condition. Since neither flag has been set, S226 determines, from the output signal of potentiometer 86, if the net actuator is between its precut and insert positions.

If S226 determines that the net actuator is between its precut and insert positions, the actuator selector relay is set at S235 to select the net actuator and the actuator driver is turned on at S236 to retract the net actuator to its precut position. A return is then made to the Main routine.

The Bale Wrap routine continues to execute until the net actuator reaches its precut position. S226 detects when this occurs. The Duckbill Position Flag is set at S227, the actuator driver is turned off at S228, and the actuator selector relay is energized at S229 to select the twine actuator.

On the next execution of the Bale Wrap routine, the test at S225 finds the Duckbill Position Check Flag set. At S230 the twine actuator position potentiometer 84 is tested to determine if the twine actuator is at the insert position. If it should not be in the insert position, the actuator driver is turned on at S234 before returning to the Main routine. However, the twine actuator should be at its insert position by virtue of S106-S108 so the twine actuator driver is turned off at S231, the actuator selector relay 44 is set at S232 to select the net actuator, and the Wrapper position check Flag is set at S233. At this point the twine actuator is in a position such that the twine strands are dangling in front the rotating bale. The net actuator is at its precut position. The operator, in response to the full bale alarm sounded at S217 (FIG. 9B) should have stopped forward motion of the baler.

The next time S224 is executed, it finds the Wrapper Position Check Flag set so the routine advances to S113 (FIG. 7F) that tests a Twine Inserted Flag. This flag has not yet been set. S114 is executed to determine if a Restart Wrap Cycle Flag has been set. The Restart Wrap Cycle Flag has not been set so at S115 the output of the net actuator position sensing potentiometer 86 is sampled to determine if the net actuator is at its twine insert position. The net actuator is still in its precut position so at S116 the actuator selector relay is turned off and at S117 drivers 45 and 47 are turned on to energize the net actuator drive motor 50 to drive the net actuator 58 toward its twine insert position. A return is then made to the main routine.

S115 detects when the net actuator reaches its insert position and when this occurs drivers 45 and 47 are turned off at S118 to stop the net actuator.

A delay of one second is provided after the net actuator reaches its insert position to allow the twine to be caught up in the rotating bale. The timer is tested at S119 to determine if it has been set and since it is not initially set it is set at S120 and tested at S121 to determine if it has tolled the 1-second interval.

Since the timer has just been set the test at S121 will initially determine that the interval has not elapsed so a return is made to the main routine.

The first execution of S121 following expiration of the 1-second interval detects that the interval has expired. Drivers 45 and 47 are set at S122 to begin driving the net actuator drive motor 50 to move the net actuator back to its precut position, and the Twine Inserted Flag is set at S123.

On the next following execution of the routine S113 detects that the Twine Inserted Flag has been set. A Restart Wrap Cycle Flag is tested at S124 and since it has not been set a Retract To Cut Twine Flag is tested at S126. This flag has not yet been set so an Insert Twine Cycle Done Flag is tested at S127. This flag has not been set so at S128 the output of the net actuator position sensing potentiometer 86 is sampled to determine if the net actuator 58, which began moving when S122 was executed, has reached its precut position.

Initially, the net actuator is still moving toward the precut position when S128 is executed so the routine returns to the main program.

S128 detects when the net actuator has reached its precut position and the routine advances to S129 that turns off the drivers 45 and 47 thus stopping the net actuator. The Insert Twine Cycle Done Flag is set at S130 and at S131 the net/twine actuator relay 44 is energized to select the twine actuator drive motor 48 for activation when drivers 45,47 are next turned on.

Figure 7C:
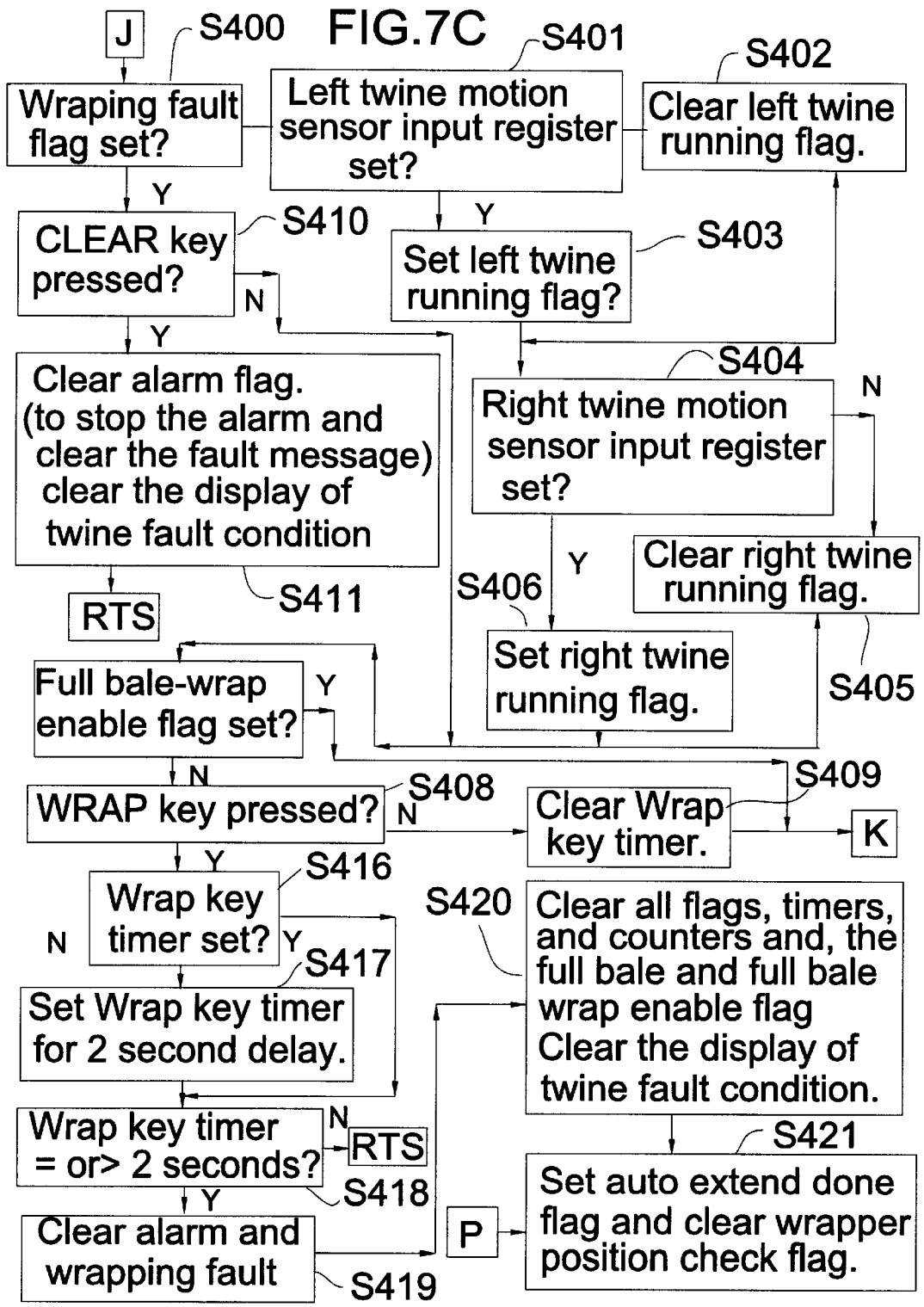
Figure 7D:
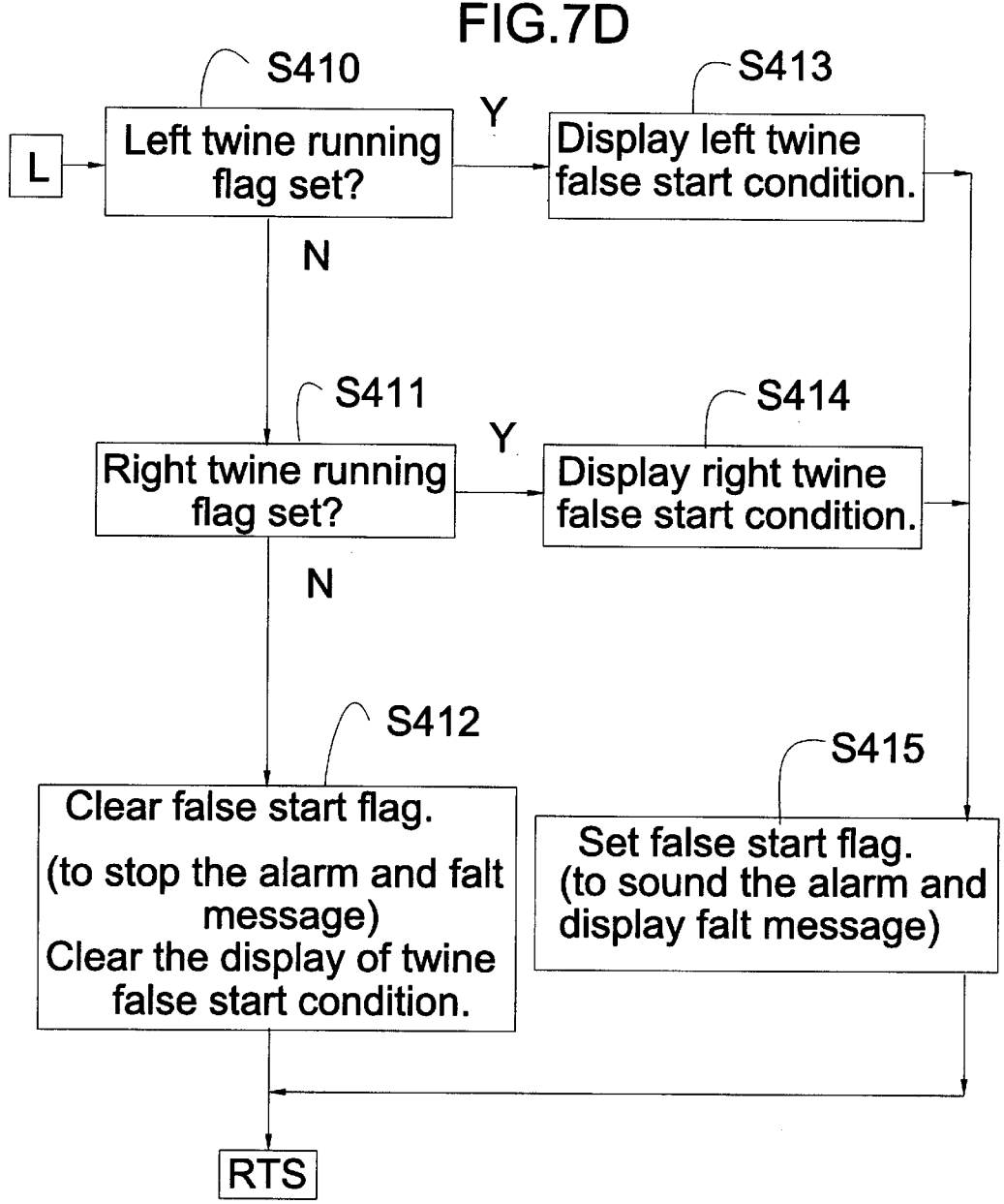
Figure 7F:
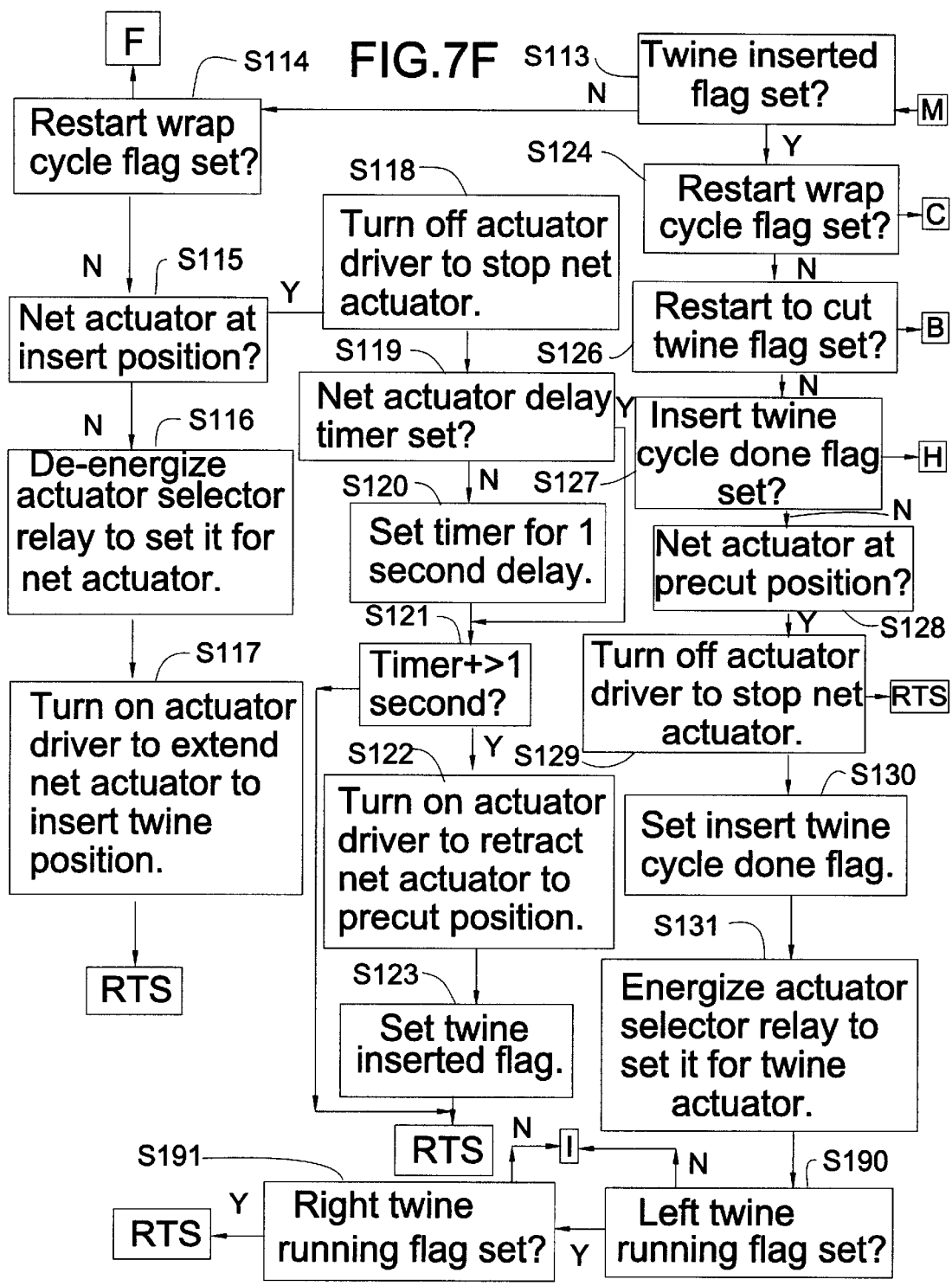
Figure 7G:
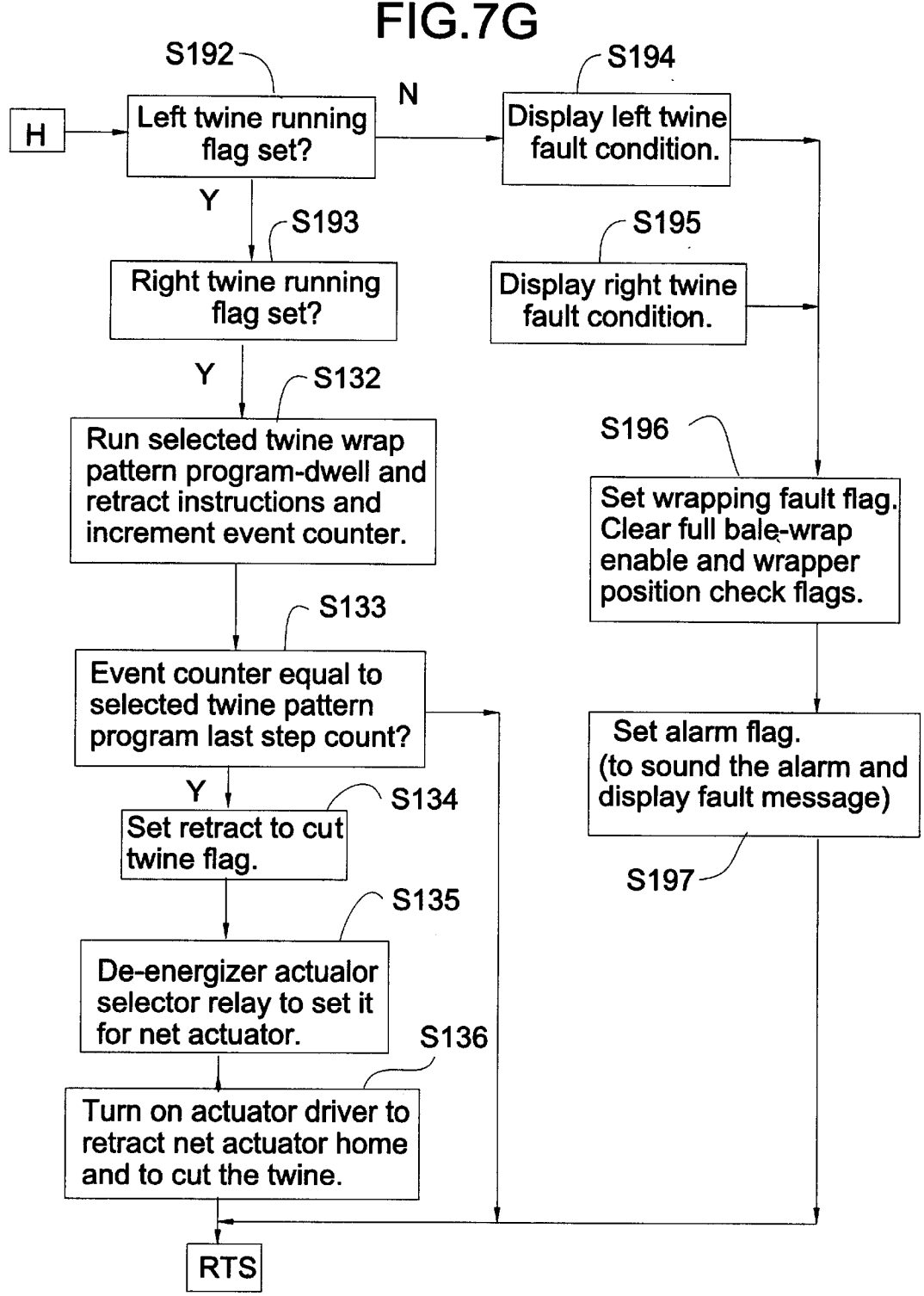
Figure 7H:
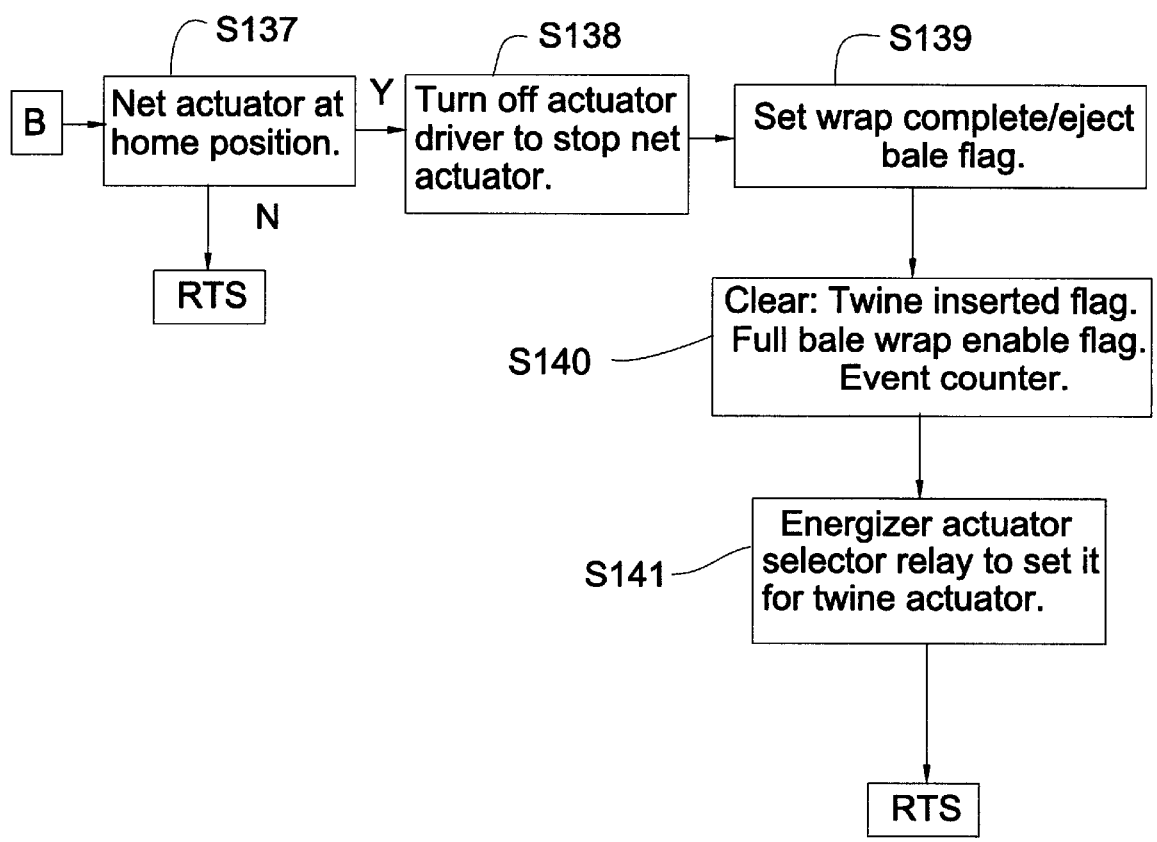
Figure 71:
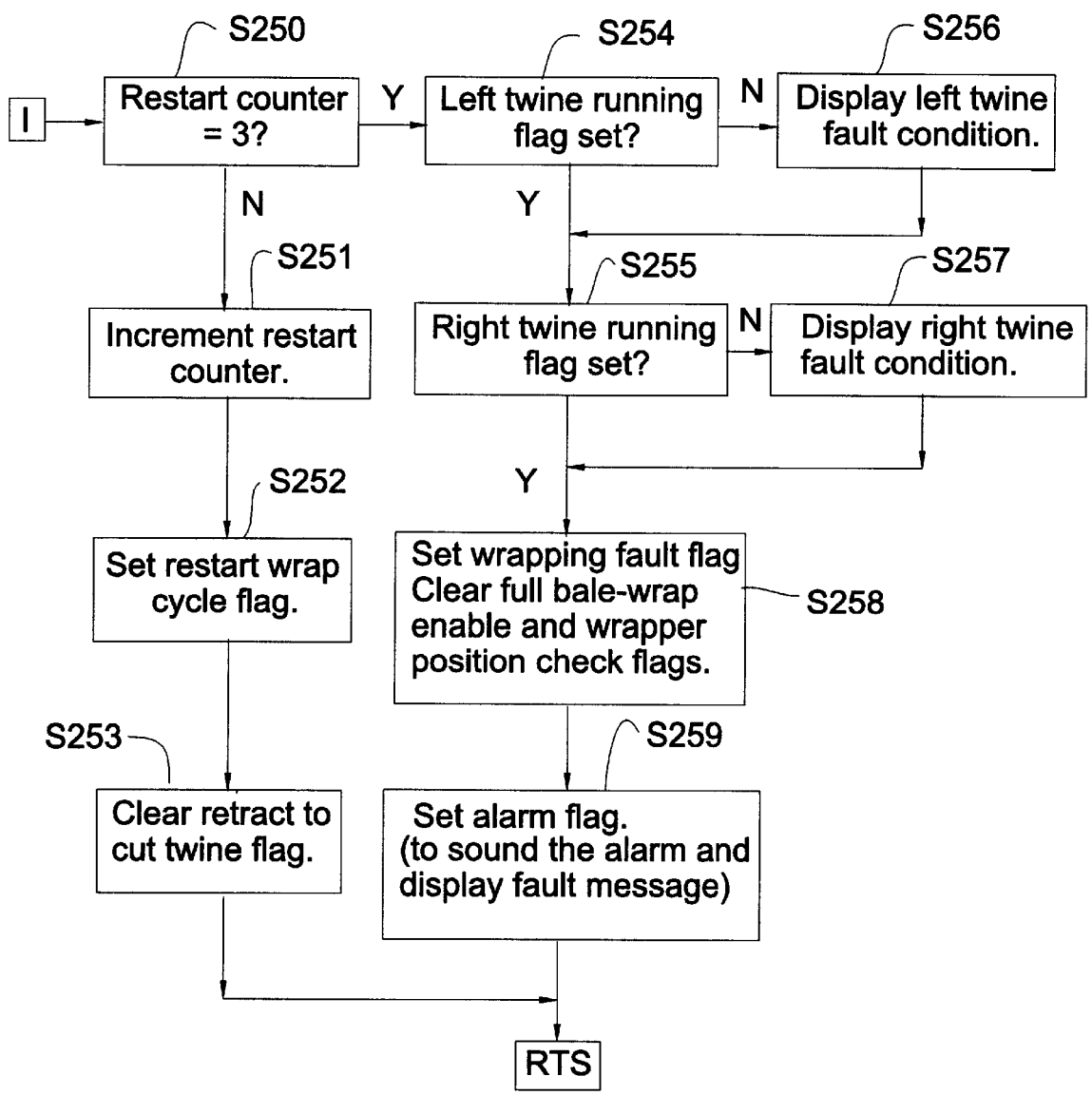

When the net actuator was moved to its insert twine position by S117, the twine strands should have been caught up in the rotating bale. Movement of the twine strands causes the left and right twine running flags to be set at S403 and S406 (FIG. 7C). In FIG. 7F, these flags are tested at S190 and S191.

Assuming that both strands are moving, a return is made to the Main routine. On the next following execution of the Wrap routine S127 detects that the Insert Twine Cycle Done Flag has been set and the routine branches to FIG. 7G where the left and right twine running flags are again tested at S192 and S193. These tests are for the purpose of detecting a wrapping failure due to twine breakage after the twine strands have begun to wrap around a bale. If the left strand breaks, a left twine fault condition is set at S194 and if the right strand breaks a right strand fault condition is set at S195. After the fault is set, a Wrapping Fault Flag is set and the Full Bale/Wrap Enable and wrapper position check flags are cleared at S196. The routine then sets an Alarm flag at S197 that causes the sounding of an alarm and display of the fault message set at S194 or S195.

Assuming that both twine strands are caught up in the bale and do not break, the routine executes S132. During execution of S132 the bale is wrapped according to a selected pattern program comprising a sequence of dwell and retract instructions which cause movement of the twine actuator toward its home position with intermittent dwells or pauses to place circular wraps on the bale. An event counter associated with the program is incremented as each instruction is completed. U.S. Pat. No. 4,609,984 describes in detail the execution of a wrap pattern program.

S133 tests the event counter associated with the pattern program to determine if it is equal to the last pattern program step count. As long as the event counter is not equal to the last step count the wrap routine returns to the Main routine from S133 but when the event counter is equal to the last step count the Retract To Cut Twine Flag is set at S134. The net/twine actuator selector relay is then de-energized during S135 to select the net actuator drive motor 50 and S136 sets drivers 45 and 47 so that the motor is energized to drive the net actuator 58 toward its home position. This pivots the duckbill 60 toward its home position and the duckbill drives knife assembly 74 to cut the twine. The wrap routine then returns to the main program.

On the next execution of the wrap routine S126 (FIG. 7F) detects that the Retract To Cut Twine Flag is now set. The routine branches from S126 to S137 (FIG. 7H) which samples the output of the net actuator position sensor potentiometer 86 to determine if the net actuator, put in motion at S136, has reached its home position. The wrap routine returns to the Main routine if the net actuator has not reached its home position.

When S137 detects that the net actuator has reached its home position, the routine advances to S138 which turns off the drivers 45 and 47 to stop the net actuator. S139 then sets the Wrap Complete/Eject Bale Flag and S140 clears the Twine Inserted Flag, the Full Bale Enable Flag and the event counter. Finally, in preparation for the next bale wrapping cycle, S141 energizes the actuator selector relay 44 to set it for the twine actuator drive motor 48. This completes the wrapping cycle. On the next execution of the routine, when S110 (FIG. 7A) is reached, the test of the Wrap Complete/Eject Bale Flag finds that the flag is now set so the wrap routine returns to the Main program directly from S110.

Normally, this continues until the tailgate is opened at which time S103 detects that the tailgate switches are not closed and S104 clears all flags, counters and timers used in the routine.

The foregoing description assumes a normal bale wrapping cycle wherein both twine strands are caught up in the bale. In accordance with the present invention, means are provided for automatically re-starting the bale wrapping cycle if one or both twine strands are not caught up in the rotating bale. The re-start is accomplished without action by the operator and the re-start may be initiated N times where N is an integer greater than zero. Preferably, the number of re-tries is limited to three. If the wrapping operation is unsuccessful for three consecutive tries then in all likelihood operator intervention is required to fix the problem.

If the left or right twine strand is not caught up in the rotating bale, the left or right twine running flag is not set at S403 or S406 (FIG. 7C). When the flags are tested at S190 and S191 (FIG. 7F) and one of then is not set, the Bale Wrap routine moves to S250 (FIG. 7I) where the contents of a Restart Counter are compared to the value 3. This counter counts the number of wrap retries and is incremented by one at the start of each retry. If S250 determines that the counter does not hold the value 3, the counter is incremented at S251, a Restart Wrap Cycle Flag is set at S252, and the Retract to Cut Twine Flag is cleared at S253.

On the next execution of the Bale Wrap routine, S124 (FIG. 7F) detects that the Restart Wrap Cycle Flag has been set so the routine jumps to FIG. 7J where the Retract To Cut Twine Flag is tested at S260. This flag is reset so S261 tests a Twine Actuator Return Home Flag. The return home flag is not set so it is set at S262 before returning to the Main routine.

On the next execution of the Bale Wrap routine, S261 finds that the Twine Actuator Return Home Flag has been set. The actuator driver is turned on at S263 to drive the twine actuator toward its home position. S264 then begins sampling the output of the twine actuator position sensing potentiometer 84 to determine when the twine actuator reaches its home position. Initially, the actuator will not be in its home position so a return is made to the Main routine. When S264 detects that the twine actuator is in its home position, the Retract To Cut Twine Flag is set at S265, the actuator driver is turned off at S266, and the actuator selector relay 44 is set at S267 to select the net actuator. A return is then made to the Main routine.

The next time the Bale Wrap routine is executed, S260 detects that the Retract To Cut Twine Flag has been set. S268 tests a delay timer to determine if it has been set. The purpose of this timer is to delay actuation of the net actuator for 2.5 seconds after the twine wrap actuator has been returned to its home position. The timer is not initially set so it is set at S269 and then tested at S270 before returning to the Main Routine.

When S270 detects that the 2.5 sec. interval has elapsed, the actuator drivers are turned on at S271 to drive the net wrap actuator to its home position, thereby cutting the twine strands. This removes any portion of a strand or strands that may have been wrapped around the bale. S272 tests the net wrap actuator position sensing potentiometer 86 to determine when the net wrap actuator reaches its home position. Initially, the actuator will be moving toward its home position so a return is made to the Main routine from S272.

When the net wrap actuator reaches its home position, the actuator driver is turned off at S273. The actuator selector relay 44 is then set at S274 to select the twine actuator. S275 clears the event counter used in the wrap pattern program (S132) and all timers used in the Wrap routine. S275 also clears the Twine Inserted, Retract To Cut, Twine Actuator Return Home, and Insert Twine Cycle Done Flags before a return is made to the Main program. The Restart Wrap Cycle, Wrapping Fault, and Initiate Flags remain set.

On the next execution of the Bale Wrap routine, the test at S113 (FIG. 7F) finds the Twine Inserted Flag is now clear and the test at S114 finds that the Restart Wrap Cycle Flag is set. The routine jumps to S276 (FIG. 7K) where the twine actuator position sensing potentiometer 84 is tested to determine if the twine actuator is at its home position. The twine actuator was moved to its home position by S263 so at S277 the actuator driver is turned on to extend the actuator to its twine insert position. The actuator selector relay 44 was set at S274 to select the twine actuator. When S276 detects that the twine actuator is in its insert position, the actuator driver is turned off at S278, the actuator selector relay is set at S279 to select the net actuator, and the Restart Wrap Cycle Flag is cleared at S280.

The wrapping mechanism is now conditioned to retry wrapping the bale. Assuming no problems during the retry, program proceeds as described above. If either twine strand is not caught up in the rotating bale, the problem is detected at S190 or S191 (FIG. 7F) and the routine moves to FIG. 7I where the restart counter is tested at S250 and incremented at S251 before the Restart Wrap Cycle Flag is again set at S252 to initiate another retry.

When the test at S250 shows that three retries have been made, the left and right twine running flags are tested at S254 and S255, respectively, to determine the twine strand or strands causing the problem. If the left twine running flag is not set, S256 sets a message to indicate a left strand fault and if the right twine running flag is not set S257 sets a message to indicate a right strand fault. S258 sets the Wrapping Fault Flag and clears the Full Bale/Wrap Enable Flag and the wrapper position check flags. S259 then sets the Alarm Flag to cause sounding of the alarm and display of the fault message or messages set at S256 and/or S257.

After the operator has turned the power off and fixed the problem, he may again try to wrap the bale by turning the power on and pressing the Wrap key 314. When power is turned on, the Wakeup Lockout Flag is set and the Lockout Timer is reset at S201 (FIG. 9A) to time a 10sec. interval the first time the Bale Density routine is executed. During this interval the Bale Density routine calculates and displays the density of the bale in the bale-forming chamber. Even though the displayed bale density may exceed the calculated density so that the Full Bale Flag is set and the alarm is sounded at S217 (FIG. 9B), the Full Bale Wrap Enable Flag cannot be set at S219 for 10sec. because the Wakeup Lockout Flag is set.

Meanwhile, the Bale Wrap routine is executing. On its first execution the routine follows S100-S103 in FIG. 7A, and S400-402, S404 and 405 and S407-S409 in FIG. 7C and S105-S106 in FIG. 7B as previously described. If S106 determines that the twine actuator is not at its insert position S107 turns on the actuator driver to begin moving the actuator to that position. Except for S102, the same steps are executed on succeeding cycles of the Bale Wrap routine until S106 detects that the twine actuator is at its insert position. When this occurs, S108-S111 and S410-S412 (FIG. 7D) are executed.

Nothing further happens until the operator presses the Wrap key. The operator must wait at least 10 seconds after wakeup before pressing the Wrap key, thus providing time for the Wakeup Lockout Flag to be cleared in the Bale Density routine. Pressing of the Wrap key is detected at S408 (FIG. 7C). A wrap key timer is tested at S416 and if it is not set then it is set at S417 to time the 2 second interval. The timer is tested at S418 and for the 2-second interval the route returns to the Main routine.

When the test at S418 determines that 2 seconds has elapsed since pressing of the wrap key, the Alarm and Wrapping fault flags are cleared at S419. S420 then clears all timers, counters and flags used in the Wrap routine, clears the display of all twine fault messages, and clears the Full Bale and Full Bale/Wrap Enable Flags. The Auto Extend Done Flag is set and the wrapper position check flags are cleared at S421 and the routine jumps to S217 (FIG. 9B) where the Full Bale Flag is set and the audible alarm flag is turned on.

Next, the Wakeup Lockout Flag is tested at S218. If the operator pressed the Wrap key during the 10 second wake-up interval, nothing further happens until the interval has elapsed and the Wakeup Lockout Flag is cleared. When the flag is cleared, the Full Bale/Wrap Enable Flag is set at S219. From this point wrapping proceeds as previously described.

It should be noted that some of the operations performed at S419-S421 are not necessary when the wrap key is pressed to restart wrapping at wakeup with a full bale in the bale chamber. As described in the above referenced application, the wrap key may also be used by the operator to initiate wrapping of a bale which has not reached full density, or to restart wrapping of a bale when a twine strand breaks during wrapping.

From the foregoing description it is seen that the invention provides a bale wrapping apparatus that automatically initiates a retry of a wrapping cycle in the event one or both twine strands is/are not caught up in the rotating bale so as to wrap around the bale. Plural retries may be made. After each failure, the twine wrap and net wrap actuators are returned to their home positions to cut the twine. The actuators are then moved to their twine insert positions so that another attempt may be made to wrap the bale.

A preferred embodiment has been described in detail to illustrate the principles and advantages of the invention. It will be understood that various modifications and substitutions may be made in the described embodiment without departing from the spirit and scope of the invention as defined by the appended claims. For example, the invention has been described as implemented in a baler having two twine dispensing arms each comprised of a hollow tube. The invention may also be used to advantage in balers having a single twine dispensing arm. Furthermore, the twine dispensing arm or arms need not be hollow tubes but may take any form such as solid elongated members having attached rings through which the twine strands pass. Although the electrical controller is preferably a programmed microprocessor the controller may comprise discrete electrical components.

I claim:

1. A bale wrapping system for wrapping a rotating bale of crop material with at least one strand of twine, said bale wrapping system comprising:

at least one twine dispensing arm for presenting at least one strand of twine so that an end of said strand may dangle from said arm, said arm being movable between a home position and a twine insert position where said end of said strand dangles adjacent said rotating bale;

a twine pusher movable between a first position at which it cuts said strand and a second position at which it pushes said dangling end of said strand toward said rotating bale;

a bale sensor for sensing a bale parameter which increases as said rotating bale is being formed so as to reach a desired value when said rotating bale is fully formed;

a controller responsive to said bale sensor for controlling a bale wrapping cycle during which said controller controls said twine dispensing arm to move from said home position to said twine insert position, said controller being responsive to said bale sensor for controlling said twine pusher to push said dangling end of said strand toward said rotating bale; and, a twine motion sensor for sensing motion of said strand when said dangling end is caught up in said rotating bale;

said controller being responsive to said twine motion sensor when said dangling end is not caught up in said rotating bale to automatically abort said bale wrapping cycle and initiate a new bale wrapping cycle.

2. A bale wrapping system as claimed in claim 1 wherein said controller aborts said bale wrapping cycle by returning said twine dispensing arm to said home position and returning said twine pusher to said first position to cut said strand, said controller initiating said new bale wrapping cycle by again moving said twine dispensing arm to said insert position and moving said pusher to said second position.

3. A bale wrapping system as claimed in claim 1, further comprising an audible alarm, said controller energizing said audible alarm when N consecutive new bale wrap cycles are aborted because the dangling end of said strand is not caught up in said bale, N being an integer greater than zero.

4. A bale wrapping system for wrapping a rotating bale of crop material with at least one strand of twine, said bale wrapping system comprising:

at least one twine dispensing arm for presenting at least one strand of twine so that an end of said strand may dangle from said arm, said arm being movable between a home position and a twine insert position where said end of said strand dangles adjacent said rotating bale;

a twine pusher movable toward said rotating bale to push said dangling end of said strand toward said rotating bale;

a bale sensor for sensing a bale parameter which increases as said rotating bale is being formed so as to reach a desired value when said rotating bale is fully formed; and, a controller responsive to said bale sensor for controlling said twine dispensing arm to move from said home position to said twine insert position before said rotating bale is fully formed, said controller being automatically responsive to said bale sensor for controlling said twine pusher to push said dangling end of said strand toward said rotating bale when said rotating bale is fully formed.

5. A bale wrapping system as claimed in claim 4 wherein said bale parameter is one of the group of bale parameters consisting of bale size and bale density.

6. A bale wrapping system as claimed in claim 4 wherein said bale parameter is bale density and said desired value is applied to said controller via an operator control panel.

7. A bale wrapping system as claimed in claim 4 wherein said controller moves said twine dispensing arm from said home position to said twine insert position when the sensed bale density exceeds about 50% of said desired value.

8. A bale wrapping system for wrapping a rotating bale of crop material with strands of twine, said bale wrapping system comprising:

first and second twine dispensing arms each supporting a strand of twine so that a strand end may dangle from each dispensing arm, the twine dispensing arms being movable between a home position and a twine insert position where the strand ends dangle adjacent a rotating bale;

a twine pusher movable between a first position at which it cuts said strands and a second position at which it pushes the dangling strand ends toward said rotating bale;

a bale sensor for sensing a bale parameter which increases as said rotating bale is being formed so as to reach a desired value when said rotating bale is fully formed;

a controller responsive to said bale sensor for controlling a bale wrapping cycle during which said controller controls said twine dispensing arms to move said dispensing arms to said twine insert position, said controller being responsive to said bale sensor for controlling said twine pusher to push said dangling ends of said strands toward said rotating bale; and, a twine motion sensor for each said strand, the twine motion sensors said sensing motion of said strands when said dangling ends are caught up in said rotating bale;

said controller being responsive to said twine motion sensors when a dangling end is not caught up in said rotating bale to abort said bale wrapping cycle and initiate a new bale wrapping cycle.

9. A bale wrapping system as claimed in claim 8 wherein, said controller controls said twine dispensing arms to move said twine dispensing arms toward said twine insert position as soon as the bale parameter sensed by said sensor is at least 50% of said desired bale parameter value.

* * * * *